(12) United States Patent
Kurokawa

(10) Patent No.: US 8,013,482 B2
(45) Date of Patent: Sep. 6, 2011

(54) ELECTRIC MOTOR WITH COOLING STRUCTURE

(75) Inventor: Masatoshi Kurokawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 223 days.

(21) Appl. No.: 12/083,305

(22) PCT Filed: Oct. 11, 2006

(86) PCT No.: PCT/JP2006/320683
§ 371 (c)(1),
(2), (4) Date: Apr. 9, 2008

(87) PCT Pub. No.: WO2007/043685
PCT Pub. Date: Apr. 19, 2007

(65) Prior Publication Data
US 2009/0230788 A1 Sep. 17, 2009

(30) Foreign Application Priority Data

Oct. 11, 2005 (JP) ................................ 2005-296965

(51) Int. Cl.
*H02K 9/00* (2006.01)
(52) U.S. Cl. ...... 310/54; 310/52; 310/60 A; 310/156.37; 310/268; 310/71; 310/58; 310/59

(58) Field of Classification Search ................ 310/52, 310/58, 59, 60 A, 156.37, 268, 54; *H02K 9/00*
See application file for complete search history.

(56) References Cited

U.S. PATENT DOCUMENTS

| 3,789,252 | A * | 1/1974 | Abegg | 310/216.007 |
| 6,488,486 | B1 * | 12/2002 | Debleser | 310/52 |
| 6,664,692 | B1 * | 12/2003 | Kristoffersen | 310/179 |
| 7,256,526 | B1 * | 8/2007 | Perkins et al. | 310/216.102 |
| 2005/0035672 | A1 * | 2/2005 | Ward et al. | 310/54 |
| 2005/0236918 | A1 * | 10/2005 | van den Bergh et al. | 310/68 R |

FOREIGN PATENT DOCUMENTS

| EP | 0 582 563 | 7/1993 |
| JP | 0 484 548 | 5/1991 |
| JP | 2004-120909 | 4/2004 |
| JP | 2004-120910 | 4/2004 |
| WO | 97/23942 | 7/1997 |
| WO | 98/07227 | 2/1998 |

* cited by examiner

*Primary Examiner* — Quyen Leung
*Assistant Examiner* — Michael Andrews
(74) *Attorney, Agent, or Firm* — Squire, Sanders & Dempsey (US) LLP

(57) ABSTRACT

An electric motor (10) includes a stationary shaft-shaped central portion (100) extending through respective central portions of an inner rotor (301), an outer rotor (302), and a stator (200), and a cooling structure (400) provided using the interiors of the stator and the shaft-shaped central portion. The motor can be used as an in-wheel motor for directly driving each wheel of the motor vehicle.

7 Claims, 23 Drawing Sheets

ELECTRIC MOTOR WITH COOLING STRUCTURE

TECHNICAL FIELD

The present invention relates generally to an electric motor and, more particularly, to an electric motor for use as an in-wheel vehicle drive motor, for example.

BACKGROUND ART

An in-wheel vehicle drive motor incorporated in each of a plurality of wheels of a vehicle for directly driving the wheels in a rotatable manner is disclosed in JP 2004-120909A and JP 2004-120910A, for example. Such an electric motor is referred to as an "in-wheel motor."

Each of the in-wheel motors described in the two above-noted patent documents comprises a motor housing, a rotor that is rotatably supported inside the motor housing and that is connected to the vehicle driving wheels, and a stator in which numerous stator coils are disposed in the order of U-, V-, and W-phases inside the motor housing on the external peripheral side of the rotor. The stator coils are electrically connected to a controller disposed outside of the motor housing, and are energized by the controller in accordance with the rotation angle of the rotor in each phase.

The invention disclosed in JP 2004-120909 A reduces manufacturing costs and achieves a smaller size in the width direction of the vehicle in an in-wheel motor having the above-described configuration by providing a holder for electrically assembling the stator coils in prescribed locations in the housing without the use of a wire connection unit. The invention disclosed in JP 2004-120910 A reduces manufacturing costs and achieves a smaller size in the width direction of the vehicle in the same manner described above in an in-wheel motor having the above-described configuration by providing a terminal board whereby the wiring from the stator coil is electrically consolidated for each phase without the use of a wire connection unit.

In an in-wheel motor that is incorporated in a wheel as described above for directly driving the wheel in a rotatable manner, a cooling structure having a high cooling effect cannot be easily incorporated because the structure must be compactly built into a narrow space and because the structure is used in harsh or severe environments that experience vibrations, muddy water, and the like. Such a cooling structure is not disclosed for the in-wheel motors described in the two above-described patent documents.

The problem related to the cooling structure is not limited to the in-wheel motors described above, but also applies to motors in general.

Therefore, in view of the above-described problem, there is a need for an electric motor that can be compactly incorporated into a narrow space, is highly durable even in very severe environments, and a cooling structure capable of achieving high cooling performance, and allows omission as many as possible of structural parts of the cooling structure including support structures, cooling pipes, and other components.

DISCLOSURE OF THE INVENTION

According to a first aspect of the present invention, there is provided an electric motor for rotatably driving a connected load, which comprises: an outer rotor provided with a magnet and disposed inside the motor in a position close to the load; an inner rotor provided with a magnet and disposed inside the motor in a position away from the load; a stator disposed between the outer rotor and the inner rotor, and provided with a stator coil; a stationary shaft-shaped central portion disposed so as to extend completely through respective central portions of the outer rotor, the inner rotor, and the stator; and a cooling structure provided using the interiors of the stator and the shaft-shaped central portion.

In the above-described motor, since the cooling structure is provided using an internal structure of a stationary structural part of the motor including the stator and the shaft-shaped central portion, the cooling structure is compact as a whole and allows omission as many as possible of structural parts including cooling pipes and other related components.

Preferably, the motor is an in-wheel vehicle drive motor that is incorporated into a wheel of a vehicle for directly driving the wheel in a rotatable manner, wherein the outer rotor is disposed on a wheel side of the vehicle, and the inner rotor is disposed on a vehicle body side of the vehicle. With this arrangement, the motor has an optimal compact structure for an in-wheel motor for driving a vehicle.

Preferably, the stator comprises a coil holder for holding the stator coil, and a coil cover for covering the stator coil. The cooling structure comprises flow channels (cooling flow channel structure) formed in at least one of the coil holder and the coil cover for circulation of a coolant to cool the stator coil. By thus providing the coil-cooling flow channels in at least one of the coil cover and the coil holder, the stator coil of the stator, which forms a heat source and is disposed closely between the coil cover and the coil holder, can be efficiently cooled by the coolant as it is circulating through the coil-cooling flow channels.

Preferably, the motor comprises a coolant inlet port and a coolant outlet port that are provided in an end portion of the shaft-shaped central portion. The coolant inlet port and the coolant outlet port communicate with the flow channels so that the coolant is supplied from the coolant inlet port to the flow channels and after circulation through the flow channels the coolant returns to the coolant outlet port. With this arrangement, the stationary shaft-shaped central portion, which is fixed to the body side of the vehicle, is used to form a part of the cooling structure.

Preferably, the cooling structure further includes a coolant manifold disposed between the coolant inlet and outlet ports and the flow channels for allotting a supply path and a return path of the coolant to each of individual cooling flow channel of the flow channels. With the coolant manifold thus provided, the coolant can easily be distributed to and collected from individual cooling flow channels of the flow channels (cooling flow channel structure). Furthermore, since the coolant having sufficient cooling performance is circulated through each individual cooling flow channel, and cooling can be carried out with high efficiency.

Preferably, the coil holder and the coil cover both have a planar disk shape, and each of the flow channels for cooling the stator coil is disposed on one side of the coil holder and on one side of the coil cover. With this arrangement, flow channels for cooling the stator coil (cooling flow channel structure) can be incorporated in a relatively simple structure.

Preferably, the flow channels for cooling the stator coil comprise a plurality of individual cooling flow channels divided in a circumferential direction of the coil holder and the coil cover. Each of the individual cooling flow channels comprises an outgoing path that extends in a radial outward direction between central portions and outer peripheral portions of coil holder and the coil cover, and a return path that extends in a radial inward direction between the central portions and the outer peripheral portions of the coil holder and the coil cover.

It is preferable that the outer rotor and the inner rotor are integrated with each other and rotatable in unison with each other. With this arrangement, the rotational drive force can be increased because the rotor comprises two rotors, i.e., the outer rotor and the inner rotor.

In one preferred form, the coil holder and the coil cover are connected together by a plurality of hollow bolts, and each of the individual cooling flow channels of the coil holder and a corresponding one of the individual cooling flow channels of the coil cover are connected together by a flow channel formed in each of the hollow bolts. By thus using the hollow bolts not only as a fastener but also as a means for defining a channel interconnecting two mating cooling flow channels of the coil holder and the coil cover, it is possible to downsize the motor without requiring additional space for connection between such two cooling flow channels.

Preferably, each of the magnets of the outer rotor and the inner rotor is a planar disk magnet and comprises a plurality of magnet pieces arranged in a Halbach array configuration.

The stator coil is preferably a thin coil plate of circular disk-like configuration.

As described above, since the motor of the present invention includes a cooling structure, which is provided by using the interior (internal structure) of a stator and the interior (internal structure) of a stationary shaft-shaped central portion extending through respective central portions of an outer rotor, an inner rotor and the stator, the cooling structure can be incorporated in a narrow space, is highly durable even in a very severe environment, can achieve high cooling performance, and allows omission as many as possible of structural parts including support structures, the cooling pipes, and the other components.

BRIEF DESCRIPTION OF THE DRAWINGS

One preferred embodiment of the present invention will be described in detail below, by way of example only, with reference to the accompanying drawings, in which.

BEST MODE FOR CARRYING OUT THE INVENTION

First, the entire configuration of the motor according to the present invention is described with reference to FIGS. 1 to 5. In this embodiment, an electric motor 10 is an example of an in-wheel vehicle drive motor that is incorporated in each of a plurality of wheels of a vehicle for directly driving each wheel in a rotatable manner. The motor 10 is referred to hereinbelow as "in-wheel motor 10." It is apparent that the motor according to the present invention is not limited to an in-wheel motor and may generally be an electric motor having a similar structure.

Figure 1:
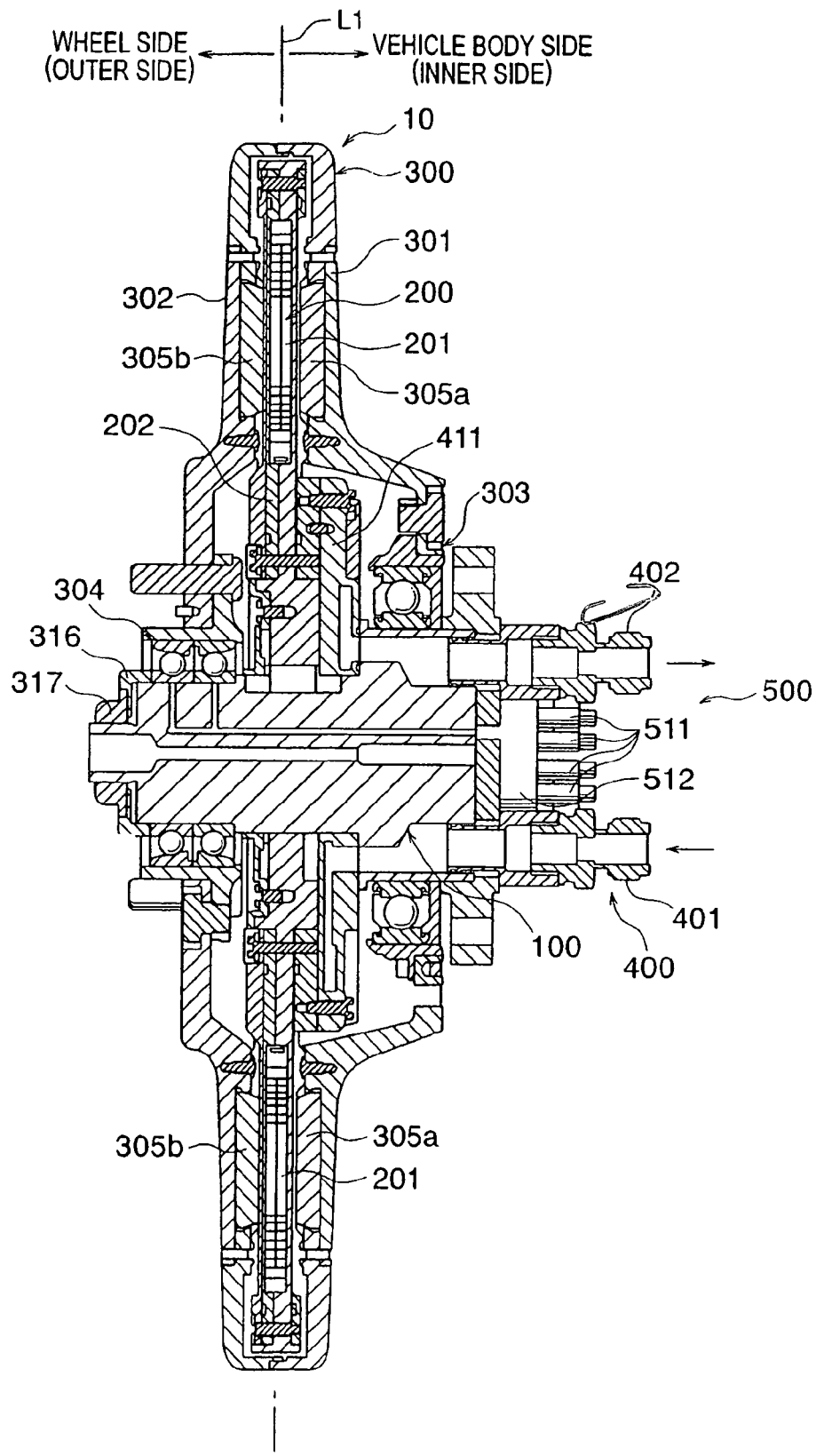
FIG. 1 is a longitudinal sectional view of an electric motor according to an embodiment of the present invention.
Figure 2:
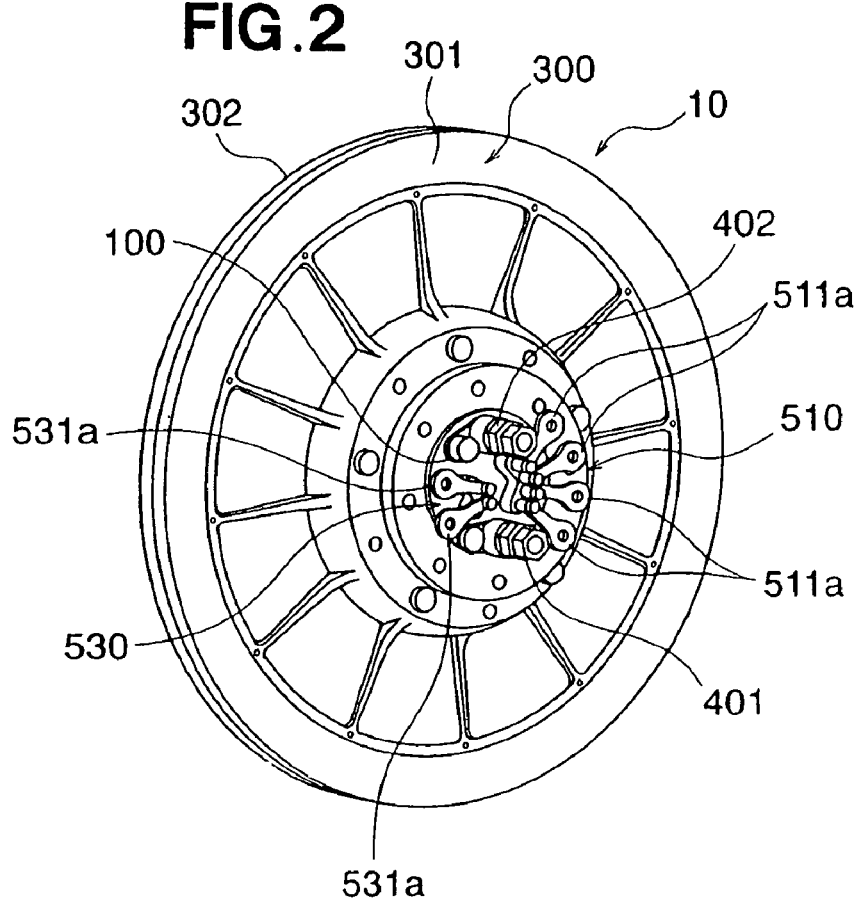
FIG. 2 is a perspective view of the motor looking from an inner side thereof.

FIG. 1 shows a longitudinal sectional view of the in-wheel motor 10; FIG. 2 shows a perspective view of the external appearance of the inner side of the motor lateral surface; FIG.

Figure 4:
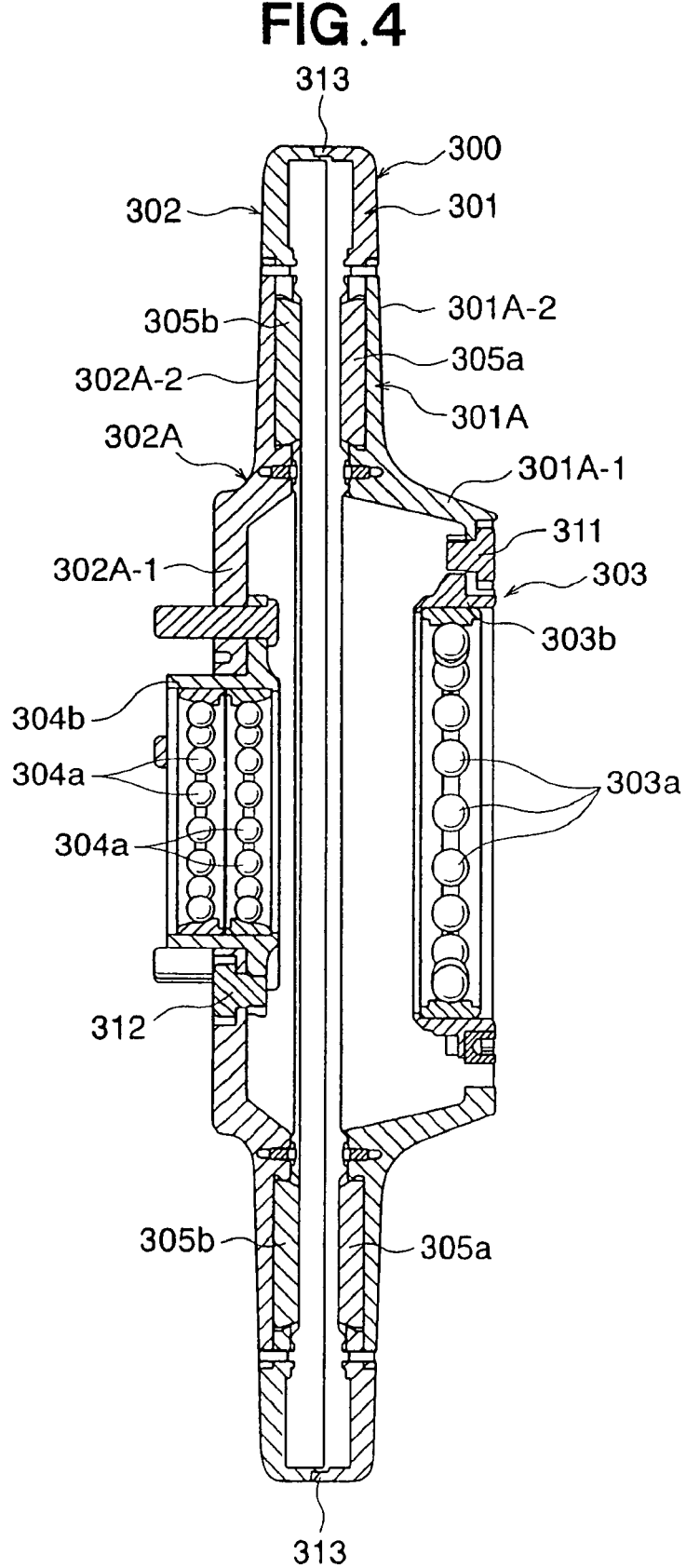
FIG. 4 is a longitudinal sectional view showing a rotatable part of the motor.
Figure 5:
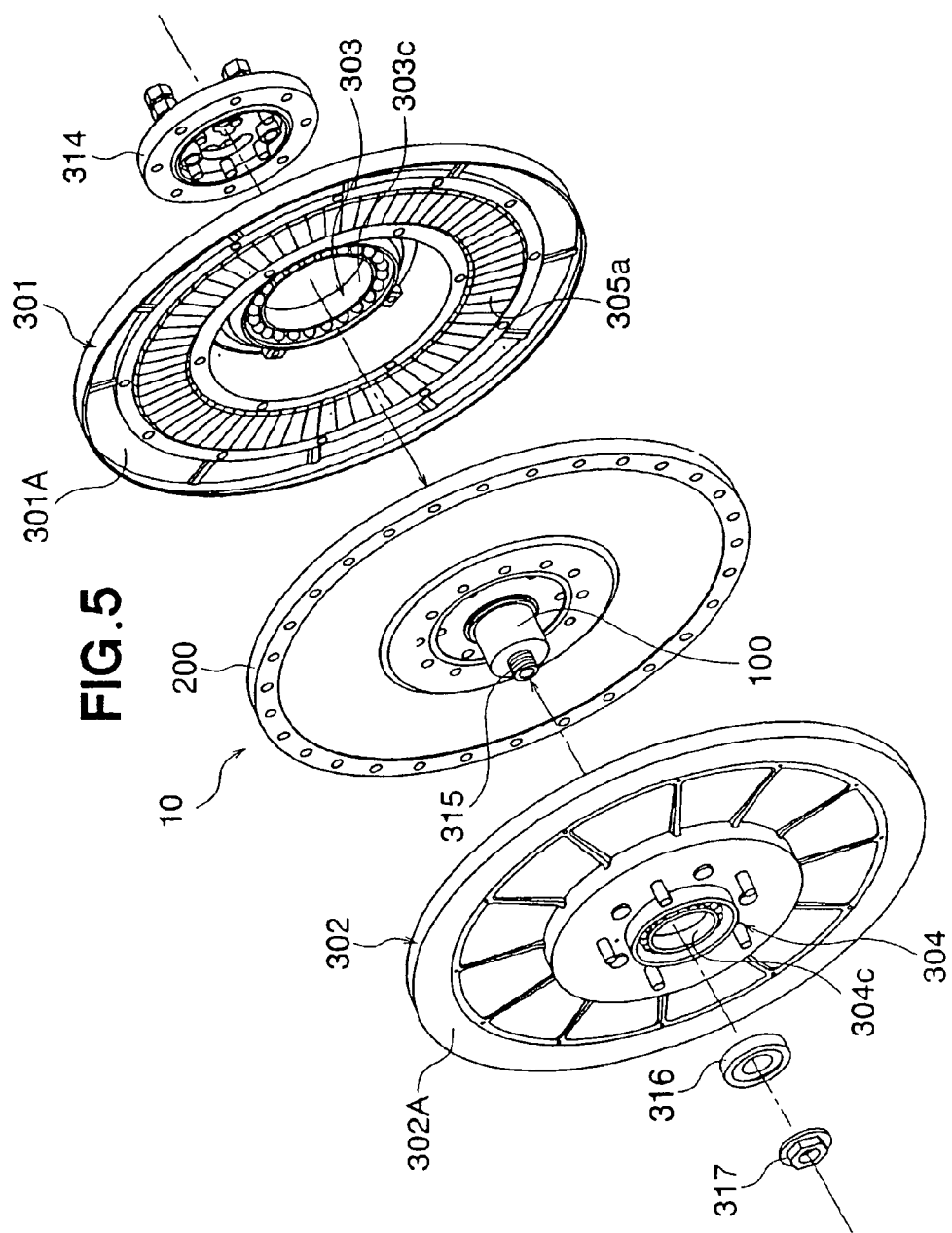
FIG. 5 is an exploded perspective view of the motor.

3 shows a perspective view of the external appearance of the outer side of the motor lateral surface; FIG. 4 shows a longitudinal sectional view of a rotating system portion (rotatable part) of the in-wheel motor 10; and FIG. 5 shows an exploded perspective view of the in-wheel motor 10.

The in-wheel motor 10 is an electric motor that is directly incorporated in a wheel as described above. Therefore, the side to the right of line L1 in FIG. 1 is a body side of the vehicle, and the side to the left is a wheel side of the vehicle, where line L1 is a boundary line. When the body of the vehicle is used as a reference, the side to the right of the boundary line L1 in FIG. 1 is the inner side, and the left side is the outer side.

The in-wheel motor 10 generally comprises a shaft-shaped central portion 100 that has a cylindrical shape and that is fixed to the vehicle body side, a substantially disk-shaped stator 200 fixed to the periphery of the shaft-shaped central portion 100, and a substantially disk-shaped rotor 300 that is provided so as to cover the stator 200 from both sides of the stator 200 and that is rotatably disposed on the periphery of the shaft-shaped central portion 100.

A cooling structure 400 and a power supply system 500 described below are incorporated in the shaft-shaped central portion 100 and stator 200. The stator 200 comprises a stator coil 201 disposed in a peripheral annular area of the stator, as described below. The stator 200 furthermore has a stator holder assembly 202. The stator holder assembly 202 comprises a coil holder plate 212 and coil cover plate 213.

The shaft-shaped central portion 100 and stator 200 described above are fixed to the vehicle body (not shown). The shaft-shaped central portion 100 and stator 200 constitute a static or stationary system of the motor 10.

The rotor 300 comprises an inner rotor 301 positioned on the vehicle body side and an outer rotor 302 positioned on the wheel side, as viewed with reference to the stator 200. The stator 200 is disposed in a positional relationship with the rotor 300 such that the stator 200 is held from both lateral surfaces by the inner rotor 301 and outer rotor 302 of the rotor 300. The inner rotor 301 is rotatably mounted about the shaft-shaped central portion 100 via a sealed ball bearing structure 303. The outer rotor 302 is rotatably mounted about the shaft-shaped central portion 100 via a sealed ball bearing structure 304. In the ball bearing structure 303 and the ball bearing structure 304, the inner races are fixed and made stationary, and the outer races can rotate.

The inner rotor 301 and outer rotor 302 are fitted with each other and are connected together at the peripheral portion of the external peripheral edges thereof. The inner rotor 301 and outer rotor 302 are integrated with each other and hence rotatable in unison with each other as a single rotor 300. The rotor 300 composed of the inner rotor 301 and outer rotor 302 is connected to the wheel (not shown).

The inner rotor 301 and outer rotor 302 are both provided with thin planar disk magnets 305a and 305b of annular or ring-like configuration. The disk magnets 305a, 305b each comprise a plurality of magnet pieces arranged in a circumferential direction in a region that faces the area in which the stator coil 201 of the stator 200 is located. The magnets 305a and 305b are arranged in a so-called Halbach array configuration. When electric current of each phase (U, V, W) is supplied to the stator coil 201 of the stator 200, the rotor 30 starts rotating in a prescribed direction due to magnetic force generated between the stator coil 201 of the stator 200 and the magnets 305a and 305b of the inner rotor 301 and outer rotor 302. Rotation of the rotor 300 causes the wheel to rotate as the wheel is connected to the rotor 300 of the in-wheel motor 10.

Figure 3:
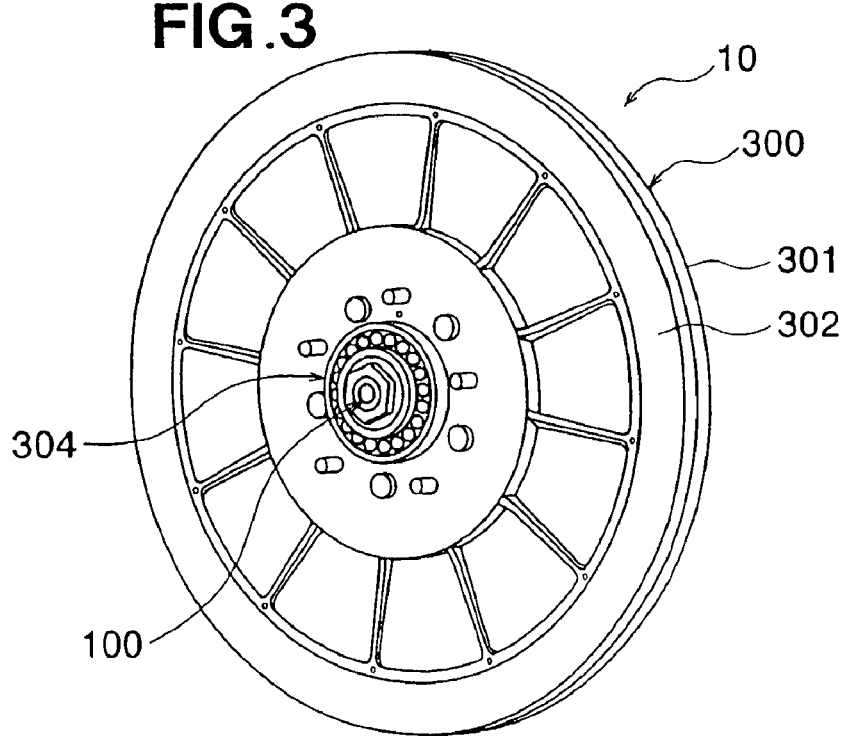
FIG. 3 is a perspective view of the motor looking from an outer side thereof.

The in-wheel motor 10 is formed so as to have an overall thin disk-like shape, as shown in FIGS. 2 and 3. FIG. 2 mainly shows the lateral surface of the vehicle side of the inner rotor 301 of the rotor 300, and the end face of the vehicle side of the shaft-shaped central portion 100. FIG. 3 mainly shows the lateral surface of the wheel side of the outer rotor 302 of the rotor 300, as well as the end face of the wheel side of the shaft-shaped central portion 100.

The interface portions (coolant inlet tube fitting 401, coolant outlet tube fitting 402, power supply terminal members 511a and 531a, and other components) of the cooling structure 400 and power supply system 500 are collectively provided as a single unit using the shaft-shaped central portion 100 of the stationary system positioned in the central portion of the in-wheel motor 10, as shown in FIG. 2 in particular. A single coolant inlet tube fitting 401 and a single coolant outlet tube fitting 402 protrude in the central portion of the lateral surface of the in-wheel motor 10 on the vehicle side, i.e., in the end face of the shaft-shaped central portion 100 on the inner rotor 301 side of the rotor; and six power supply terminals 511a and 531a are also provided, as shown in FIG. 2.

FIG. 4 is a longitudinal sectional view showing the rotating system portion (i.e., rotatable part) of the in-wheel motor 10 with other parts omitted for clarity.

Only the ball bearings 303a and 304a and the outer race portions 303b and 304b of ball bearing structures 303 and 304 are shown in FIG. 4. The outer ball bearing structure 304 has two ball bearing units disposed in tandem or side-by-side in the axial direction thereof.

Also, the inner rotor 301 has a housing 301A in FIG. 4. The housing 301A has a substantially disk-shaped form as a whole, and a central cylindrical portion 301A-1 protruding outward from an inner edge of the disk-shaped housing 301A. The outer race portion 303b is connected to the inner side of the end portion of the central cylindrical portion 301A-1 by means of a fastener 311. A prescribed number of the above-described magnets 305a are fixedly disposed in the peripheral direction on the interior lateral surface of the peripheral ring-shaped area 301A-2 of the housing 301A. The outer rotor 302 also has a housing 302A in the same manner. The housing 302A has a substantial disk shape, and the outer race portion 304b is connected to a hole 302A-1 of the central portion of the housing 302A by means of a fastener 312. A prescribed number of the above-described magnets 305b are fixedly disposed in the peripheral direction on the interior lateral surface of the peripheral ring-shaped area 302A-2 of the housing 302A.

In FIG. 4, reference numeral 313 denotes a butt fit between the housing 301A of the inner rotor 301 and the housing 302A of the outer rotor 302. The butt fit 313 is formed along the entire peripheries of the housings 301A and 302A. In the illustrated embodiment, mating surfaces of the housings 301A and 302A are stepped and fitted together to form a half-lap joint therebetween.

Described next is the assembly structure of the in-wheel motor 10 with reference to FIG. 5. The structure has the stator 200 in which the shaft-shaped central portion 100 is mounted in a central axial portion thereof, the inner rotor 301 is disposed on the inner side of the stator 200, and the outer rotor 302 is disposed on the outer side of the stator 200. The inner rotor 301 is mounted on the inner side of the stator 200 by fixing the right-end portion of the shaft-shaped central portion 100 in a hole of the inner race portion 303c in the ball bearing structure 303 of the inner rotor 301. The outer rotor 302 is mounted on the outer side of the stator 200 by fixing the left-side part of the shaft-shaped central portion 100 into a hole of inner race portion 304c in the ball bearing structure 304 of the outer rotor 302: In this case, the opposed peripheral portions between the housing 301A of the inner rotor 301 and the housing 302A of the outer rotor 302 are fitted together to form a butt fit (half-lap joint) 313 to thereby connect together the inner rotor 301 and outer rotor 302. The joint between the housings 301A and 302A is made boltless by using the fitting structure of the two housings 301A and 302A in the butt fit 313, and utilizing attraction force between the magnets 305a and 305b.

In the description above, the stator 200, inner rotor 301, and outer rotor 302 are each modularized and assembled in advance.

In the assembled state described above, a bearing structure retaining member 314 is fixed to the right-end portion of the shaft-shaped central portion 100 that protrudes further inward from the inner rotor 301. The outer rotor 302 is rotatably mounted to the shaft-shaped central portion 100, which protrudes further outward from the outer rotor 302, by threadably mounting a nut 317 on an externally threaded portion 315 of the left-side part of the shaft-shaped central portion 100 with a ring member 316 disposed between the left-side part of the shaft-shaped central portion 100 and the nut 317.

In FIG. 5, a magnet fly-off prevention cover is mounted in on the outermost surface portion of the outer side of the inner rotor 301, but for convenience of description, the cover has been removed to make the magnet 305a arrangement more easily viewable.

Following are detailed descriptions of the configurations of the stator 200, inner rotor 301, and outer rotor 302 with reference to exploded perspective views shown in FIGS. 6 through 11.

Figure 6:
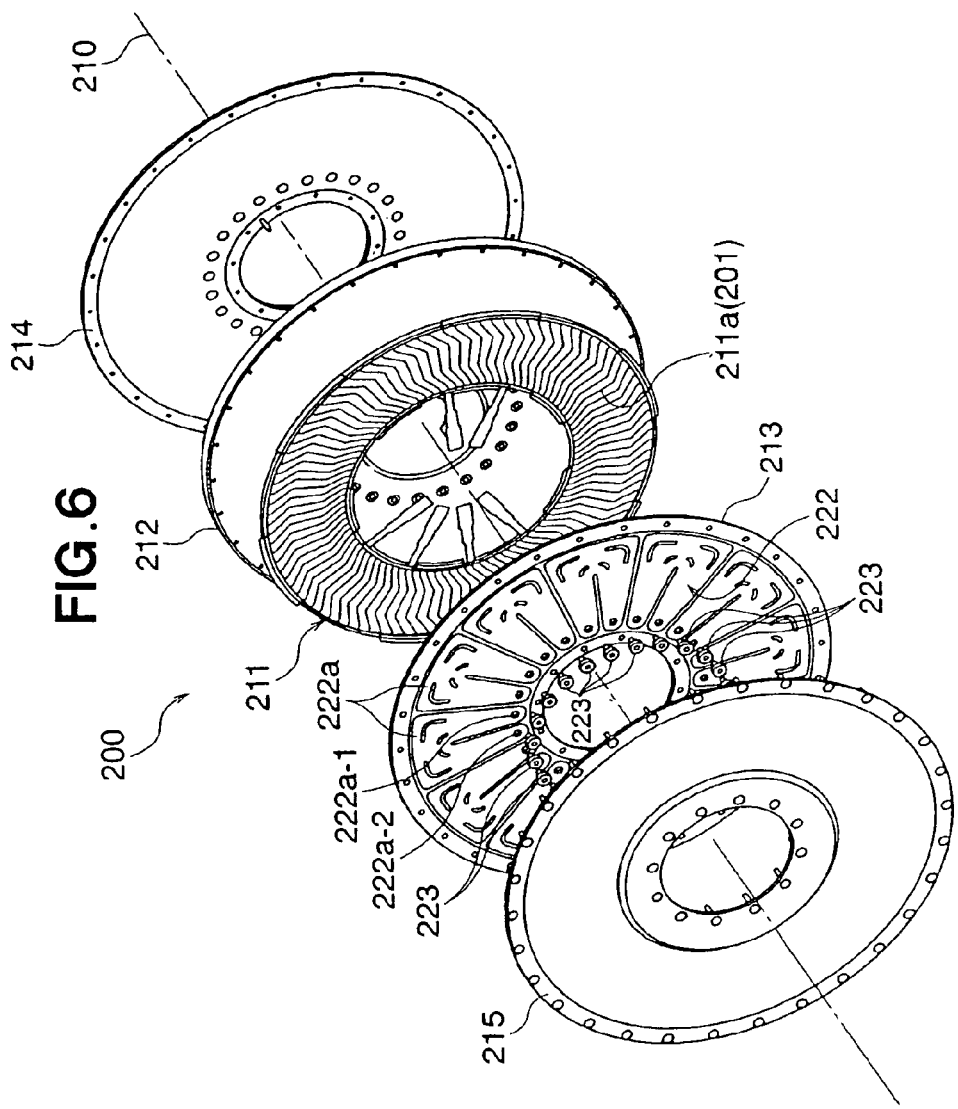
FIG. 6 is an exploded perspective view of a stator of the motor looking from the outer side thereof.
Figure 7:
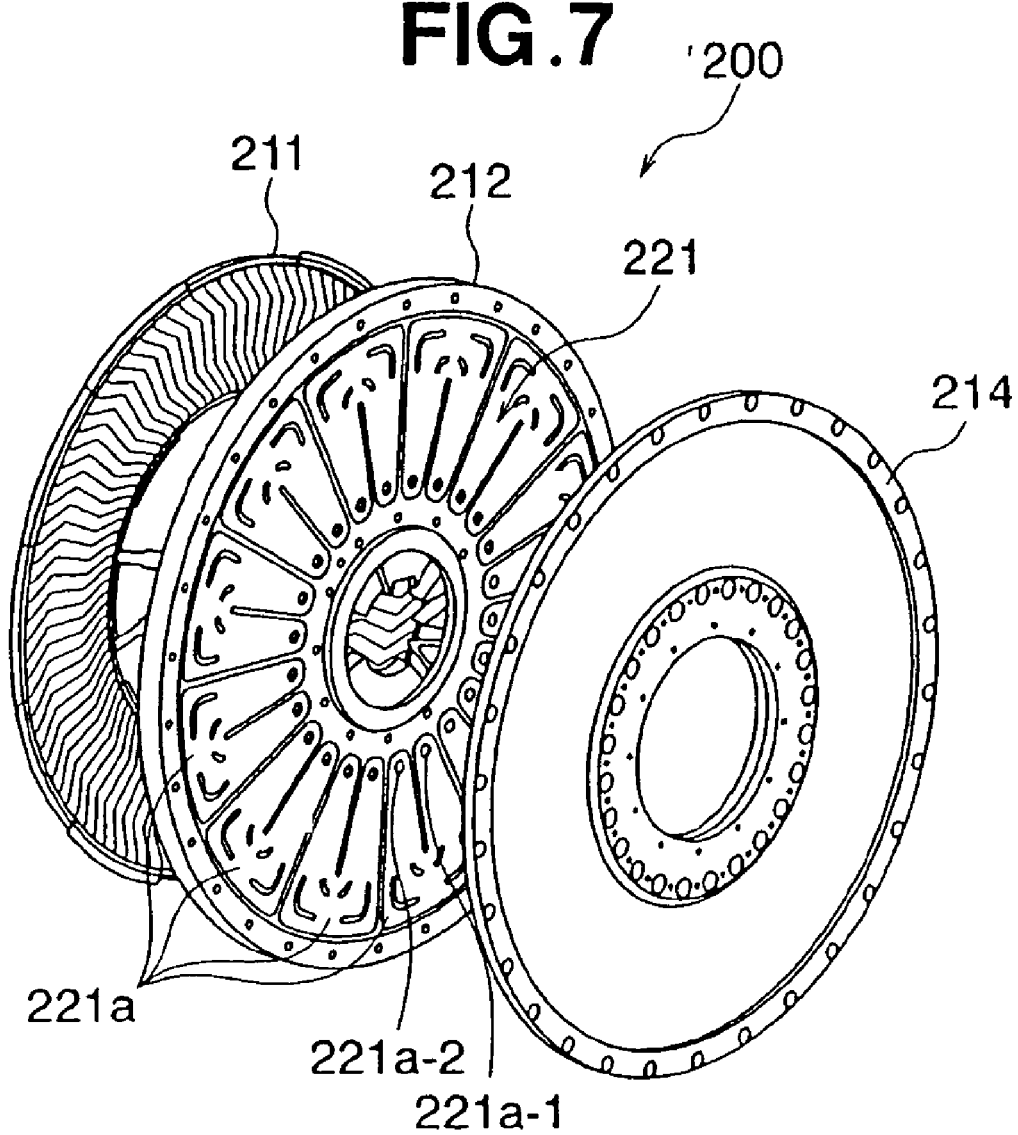
FIG. 7 is an exploded perspective view of a main portion of the stator looking from the inner side of the motor.

A detailed structure of the stator 200 is described first with reference to FIGS. 6 and 7. FIG. 6 is an exploded perspective view of the entire stator 200 as viewed from the outer side; and FIG. 7 is an exploded perspective view of a main portion of the stator 200 as viewed from the inner side.

The stator 200 with an overall shape of a disk (more precisely, an annular disk) comprises thin annular disk coil plates 211 centrally positioned on the shaft 210, a thin annular disk coil holder plate 212 positioned on the inner side (the far side in FIG. 6, and the near side in FIG. 7) of the coil plates 211, and a thin planar disk coil cover plate 213 of annular or ring-like configuration positioned on the outer side (the near side in FIG. 6) of the coil plates 211, as shown in FIG. 6. The coil holder plate 212 holds thereon the coil plates 211. In the holding state, the coil cover plate 213 covers and fixes the coil plates 211 which are mounted on the coil holder plate 212 by means of a fastener (not shown). In the configuration described above, an inner cover plate 214 shaped as an annular disk is furthermore disposed on the inner side of the coil holder plate 212, and an outer cover plate 215 is disposed on the outer side of the coil cover plate 213.

In the above description, the material of the coil holder plate 212, coil cover plate 213, inner cover plate 214, and outer cover plate 215 is an electrically insulating, nonmagnetic material, and is preferably GFRP (Glass Fiber Reinforced Plastic).

Cooling flow channel structures 221 and 222 for cooling the stator coil are formed on a lateral surface portion of the inner side of the coil holder plate 212 and a lateral surface portion of the outer side of the coil cover plate 213, respectively, as shown in FIGS. 6 and 7.

The cooling flow channel structure 221 of the coil holder plate 212 is formed by a plurality (twelve in the illustrated embodiment) of individual cooling flow channels 221a arranged in the circumferential direction. The cooling flow channel structure 221 comprising the 12 individual cooling flow channels 221a is produced by forming concavities and convexities in the lateral surface portion of the inner side of the coil holder plate 212. The sealing of the individual cooling flow channels 221a is assured by bringing the convexities of the cooling flow channel structure 221 into sealing contact with the opposing inner cover plate 214 when the assembly of the motor 10 is completed. The convexities of the cooling flow channel structure 221 are shaped and disposed so that the coolant in the individual cooling flow channels 221a flows smoothly without stagnation. The depth of the concavities (about 1 mm, for example, in the illustrated embodiment) of the cooling flow channel structure 221 is suitably determined in accordance with the thickness of the coil holder plate 212, the coolant material, the size and output of the motor 10, and other factors. Each of the 12 individual cooling flow channels 221a has a flow channel shape that reaches from the internal peripheral edge to the external peripheral edge of the disk-shaped coil holder plate 212, and again returns to the internal peripheral edge. Each of the 12 individual cooling flow channels 221a therefore has a coolant inlet hole 221a-1 and a coolant outlet hole 221a-2 in the internal peripheral edge side of the coil holder plate 212.

The configuration of the cooling flow channel structure 222 of the coil cover plate 213 is also fundamentally the same as the cooling flow channel structure 221. The cooling flow channel structure 222 is formed by a plurality (twelve in the illustrated embodiment) of individual cooling flow channels 222a arranged in the circumferential direction. The cooling flow channel structure 222 comprising the 12 individual cooling flow channels 222a is produced by forming concavities and convexities in the lateral surface portion of the outer side of the coil cover plate 213. Each of the 12 individual cooling flow channels 222a has a flow channel shape that reaches from the internal peripheral edge to the external peripheral edge of the disk-shaped coil cover plate 213, and again returns to the internal peripheral edge. Each of the 12 individual cooling flow channels 222a has a coolant inlet hole 222a-1 and a coolant outlet hole 222a-2 in the internal peripheral edge of the coil cover plate 213.

In FIG. 6, numerous coil winding patterns 211a are formed in the circumferential direction in the coil plates 211. The coil winding patterns 211a are made of copper, for example, and are separated into three phases of windings (U-phase, V-phase, and W-phase). Adjacent windings in the coil winding patterns 211a are insulated. The coil winding patterns 211a are formed by etching and diffusion bonding.

The coil plates 211, coil holder plate 212, coil cover plate 213, inner cover plate 214, and outer cover plate 215 shown in FIG. 6 are superimposed and assembled together, and the stator 200 is formed having an overall disk shape. The portion having the coil winding patterns 211a of the coil plates 211 in the stator 200 corresponds to the stator coil 201 described above. With the stator 200 in an assembled state, required winding connection portions and the shaft-shaped central portion 100 are furthermore added to the assembly.

Furthermore, in FIG. 6, numerous bolts 223 are hollow bolts having axial through-holes for allowing coolant to pass therethrough for circulation to each of the individual cooling flow channels 222a of the cooling flow channel structure 222 in the coil cover plate 213. The hollow bolts 223 allow coolant to circulate from the coolant outlet holes 221a-2 of the coil holder plate 212 in the supply line to the coolant inlet holes 222a-1 of the coil cover plate 213, and allow the coolant to circulate from the coolant outlet holes 222a-2 of the coil cover plate 213 in the return line to the coolant inlet holes 221a-1 of the coil holder plate 212. The numerous hollow bolts 223 are disposed in correspondence with the coolant inlet holes 222a-1 and coolant outlet holes 222a-2 formed on the internal peripheral edge side of the coil cover plate 213, and are threadably mounted in the coolant inlet holes 222a-1 and coolant outlet holes 222a-2.

Figure 8:
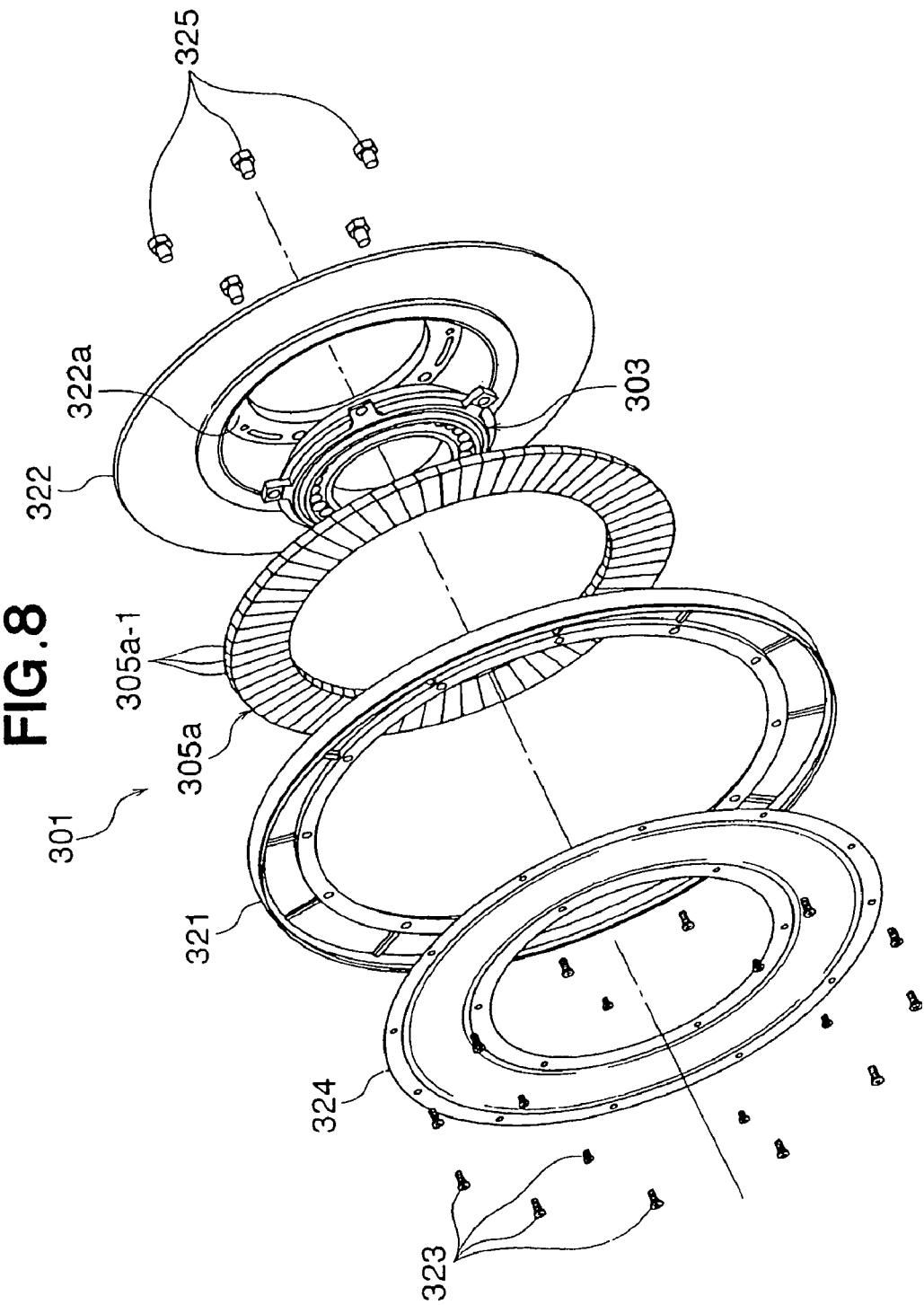
FIG. 8 is an exploded perspective view of an inner rotor of the motor looking from the outer side thereof.
Figure 9:
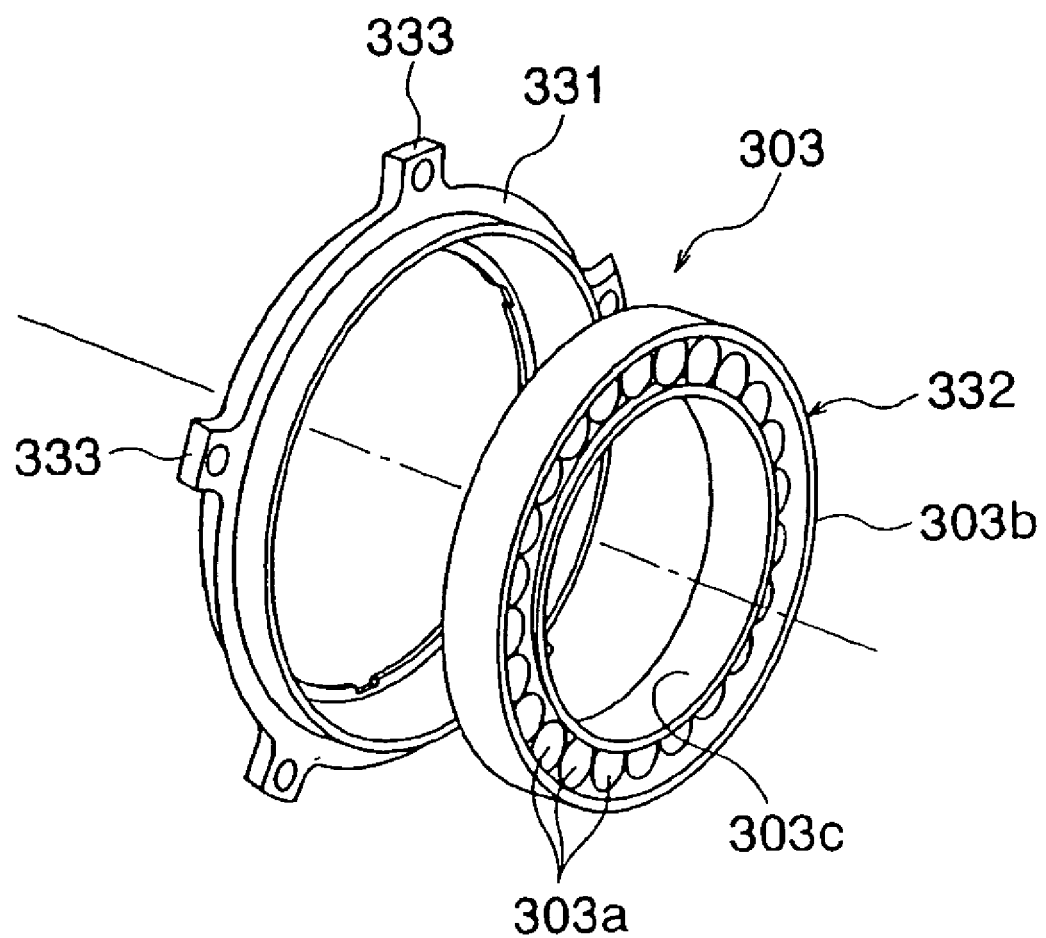
FIG. 9 is an exploded perspective view of a ball bearing structure incorporated in the inner rotor according to the present invention.

A detailed description of the configuration of the inner rotor 301 is given next with reference to FIGS. 8 and 9. FIG. 8 is an exploded perspective view of the entire inner rotor 301 as viewed from the outer side, and FIG. 9 is an exploded perspective view of the ball bearing structure 303 incorporated in the inner rotor 301.

The inner rotor 301 is essentially composed of the thin planar disk magnet 305a of annular or ring-like configuration. The disk magnet 305a comprises a large number of identically shaped magnet pieces 305a-1 arranged in the circumferential direction. The magnet pieces 305a-1 are made of an Nd—Fe—B material, for example. The magnet 305a has a so-called Halbach array configuration. As a result; the leakage flux is minimized while simultaneously making the structure more lightweight by elimination of a yoke. The disk magnet 305a may, for example, be fixed to an inner rotor disk 322 by attaching the magnet pieces 305a-1 one at a time to the inner rotor disk 322, depending on the actual manufacturing step. The disk magnet 305a fixed to the inner rotor disk 322 is furthermore fixed using the magnet-fixing ring member 321 by mounting the magnet-fixing ring member 321 on the inner rotor disk 322 from a position on the outer side of the inner rotor disk 322. In this manner, the disk magnet 305a is essentially fixed in place in a state in which the tapered surfaces at the inside and outside diameters of the disk magnet 305a are held between the magnet-fixing ring member 321 and the inner rotor disk 322 on both sides. The magnet-fixing ring member 321 and inner rotor disk 322 both have the effect of fixing the magnet 305a in place and preventing the magnet 305a from floating or lifting.

In the assembled structure as described above, a magnet fly-off prevention cover 324 is furthermore mounted on the outer side of the magnet-fixing ring member 321 by means of screws or numerous other fasteners 323. The magnet fly-off prevention cover 324 has a ring shape and is made of CFRP material. Aluminum alloy (A2017) is used for making the magnet-fixing ring member 321 and the inner rotor disk 322 more lightweight and rigid.

The ball bearing structure 303 described above is fixed by five bolts or other fasteners 325 to the interior of a protruding cylindrical portion 322a that protrudes inward toward the center of the inner rotor disk 322.

FIG. 9 shows the configuration of the ball bearing structure 303. The ball bearing structure 303 comprises a ring-shaped bearing holder 331 fixed to the protruding cylindrical portion 322a of the inner rotor disk 322, and a ball bearing unit 332 supported by an internal peripheral portion of the bearing holder 331. A plurality of ball bearings 303a is disposed between the outer race portion 303b and the inner race portion 303c of the ball bearing unit 332, as described above. The outer race portion 303b of the ball bearing unit 332 is fixed to the bearing holder 331 by press-fitting the ball bearing unit 332 into an opening in the ring-shaped bearing holder 331. The inner race portion 303c is fixed to the shaft-shaped central portion 100, which is not shown in FIGS. 8 and 9. The openings 333 disposed on the periphery of the bearing holder 331 are screw holes into which the above-described fasteners 325 are threadably mounted.

Figure 10:
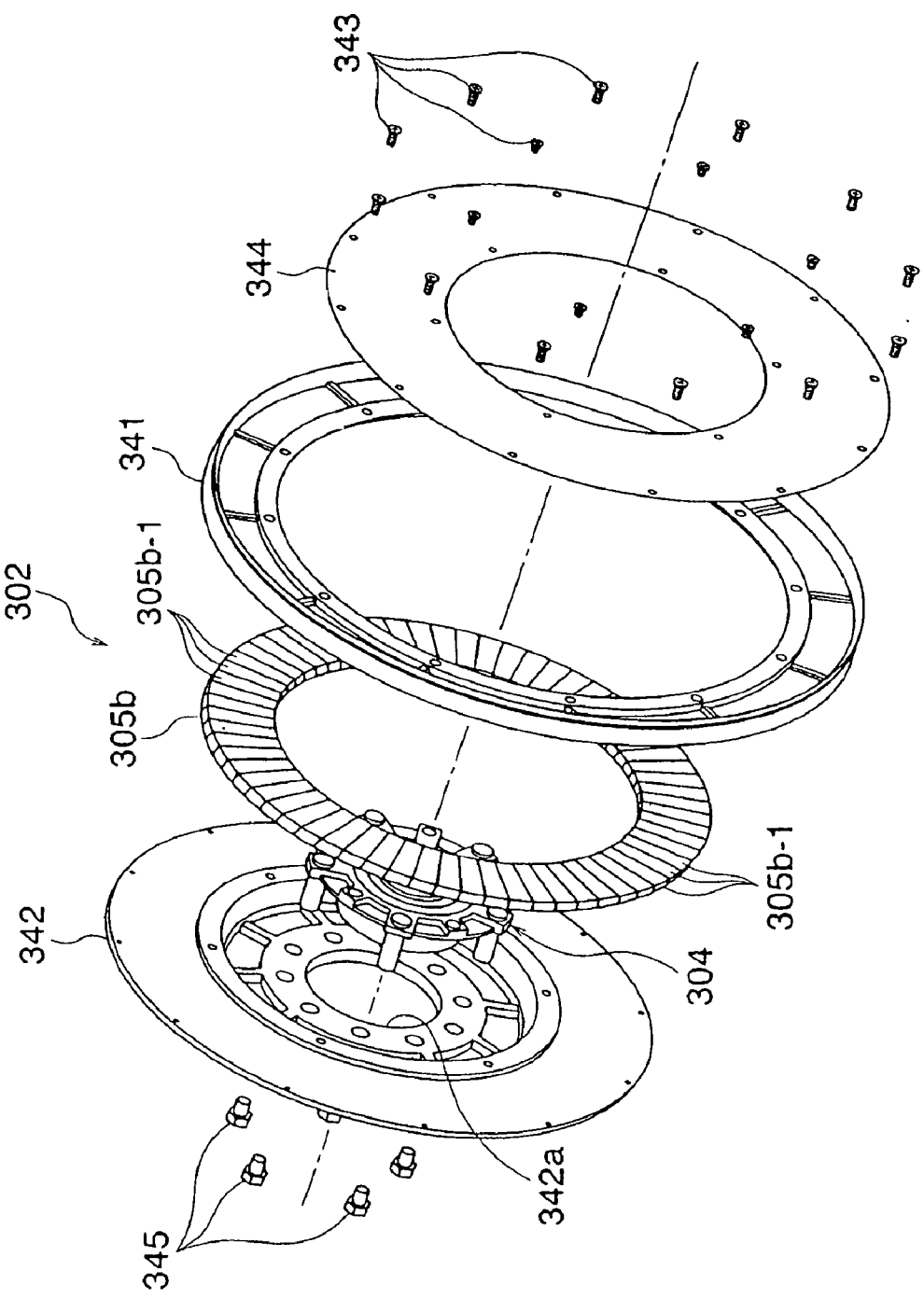
FIG. 10 is an exploded perspective view of an outer rotor of the motor looking from the inner side thereof.
Figure 11:
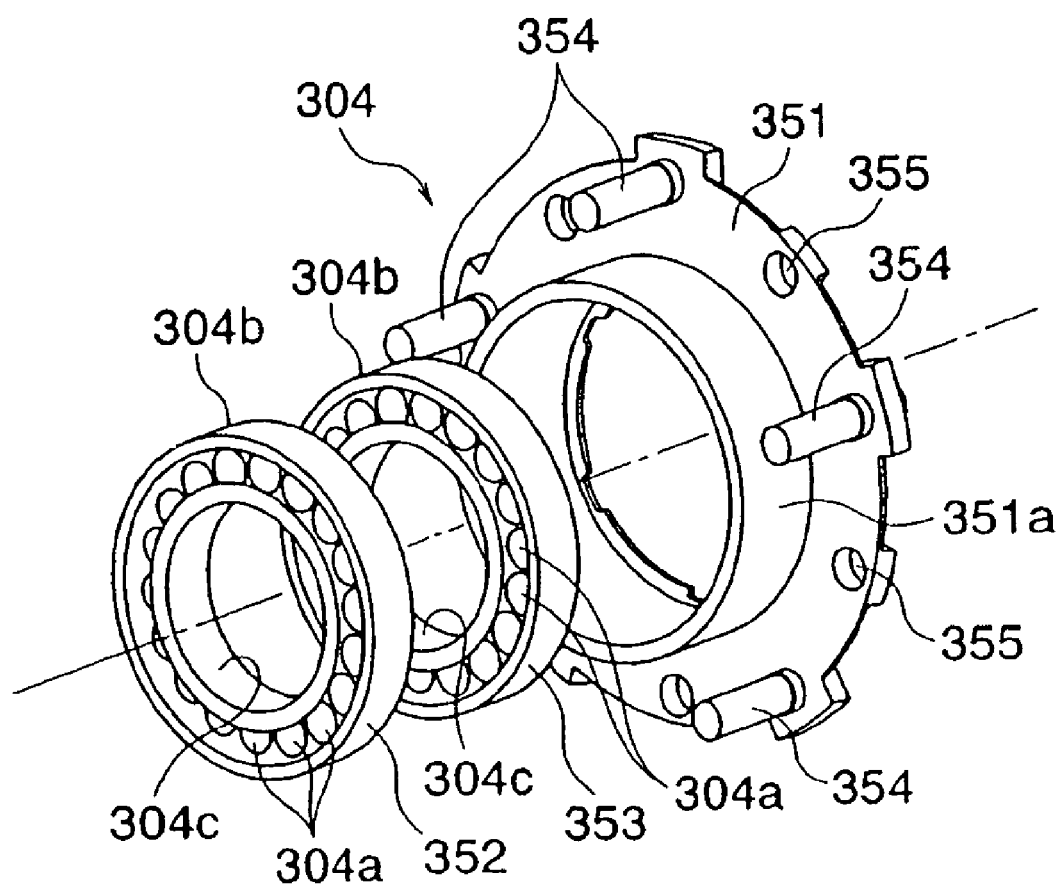
FIG. 11 is an exploded perspective view of a ball bearing structure incorporated in the outer rotor according to the present invention.

A detailed description of the configuration of the outer rotor 302 is given next with reference to FIGS. 10 and 11. FIG. 10 is an exploded perspective view of the entire outer rotor 302 as viewed from the inner side, and FIG. 11 is an exploded perspective view of the ball bearing structure 304 incorporated in the outer rotor 302.

The outer rotor 302 is essentially composed of the thin planar disk magnet of annular or ring-like configuration. The disk magnet 305b comprises a large number of identically shaped magnet pieces 305b-1 arranged in the circumferential direction. The magnet pieces 305b-1 are made of an Nd—Fe—B material, for example. The magnet 305b has a so-called Halbach array configuration. As a result, the leakage flux is minimized while simultaneously making the structure more lightweight by elimination of a yoke. The disk magnet 305b may, for example, be fixed to an outer rotor disk 342 by attaching the magnet pieces 305b-1 one at a time to the outer rotor disk 342, depending on the actual manufacturing step. The disk magnet 305b fixed to the outer rotor disk 342 is furthermore fixed using the magnet-fixing ring member 341 by mounting the magnet-fixing ring member 341 on the outer rotor disk 342 from a position on the inner side of the outer rotor disk. In this manner, the disk magnet 305b is essentially fixed in place in a state in which the tapered surfaces at the inside and outside diameters of the disk magnet 305b are held between the magnet-fixing ring member 341 and the outer rotor disk 342 on both sides. The magnet-fixing ring member 41 and outer rotor disk 342 both have the effect of fixing the magnet 305b in place and preventing the magnet 305b from floating or lifting.

In the assembled structure as described above, a magnet fly-off prevention cover 344 is furthermore mounted on the inner side of the magnet-fixing ring member 341 by means of screws or numerous other fasteners 343. The magnet fly-off prevention cover 344 has a ring shape and is made of CFRP material. Aluminum alloy (A2017) is used for making the magnet-fixing ring member 341 and the outer rotor disk 342 more lightweight and rigid.

The ball bearing structure 304 described above is fixed by five bolts or other fasteners 345 to the peripheral portion of the internal side of a center hole 342a of the outer rotor disk 342.

FIG. 11 shows the configuration of the ball bearing structure 304. The ball bearing structure 304 comprises a bearing holder 351 fixed to the peripheral portion of the internal side the center hole 342a of the outer rotor disk 342, and two ball bearing units 352 and 353 supported by the center cylindrical portion 351a of the bearing holder 351. A plurality of ball bearings 304a is disposed between the outer race portions 304b and the inner race portions 304c of the ball bearing units 352 and 353, as described above. The outer race portions 304b of the ball bearing units 352 and 353 are fixed to the bearing holder 351 by press-fitting the ball bearing units 352 and 353 into the center cylindrical portion 351a of the bearing holder 351. The inner race portions 303c of the ball bearing units 352 and 353 are fixed to the shaft-shaped central portion 100, which is not shown in FIGS. 10 and 11.

As shown in FIG. 11, five outwardly protruding pin members 354, for example, having a prescribed length are disposed on an annular flange of the bearing holder 351. Also, the five openings 355 formed in the flange of the bearing holder 351 are screw holes in which the above-described fasteners 345 are threadably mounted. The motor 10 according to the present invention is an axial disk motor comprising a very thin stator 200 (coil plates 211), an inner rotor 301, and an outer rotor 302, as described above. In the present invention, the eddy loss and circulation loss in the holder member are eliminated and the stator 200 is made more lightweight by using GFRP as the material for the coil holder plate 212 and other components of the stator 200.

The above-described cooling structure 400 and power supply system 500 are provided using the shaft-shaped central portion 100 or the like on the in-wheel motor 10 comprising the stator 200 and rotor 300 (inner rotor 301 and outer rotor 302) having the mechanical and electrical configuration described above. The cooling structure 400 and power supply system 500 are described in detail below.

The cooling structure 400 is described first. The function of the cooling structure 400 is to cool the stator 200 to thereby suppress generation of heat in the stator coil 201 of the stator 200. In the cooling structure 400, coolant (e.g., water) fed from the exterior by means of a pump or the like is passed through the shaft-shaped central portion 100 and is caused to circulate in the cooling flow channel structure 221 of the coil holder plate 212 and in the cooling flow channel structure 222 of the coil cover plate 213.

Figure 12:
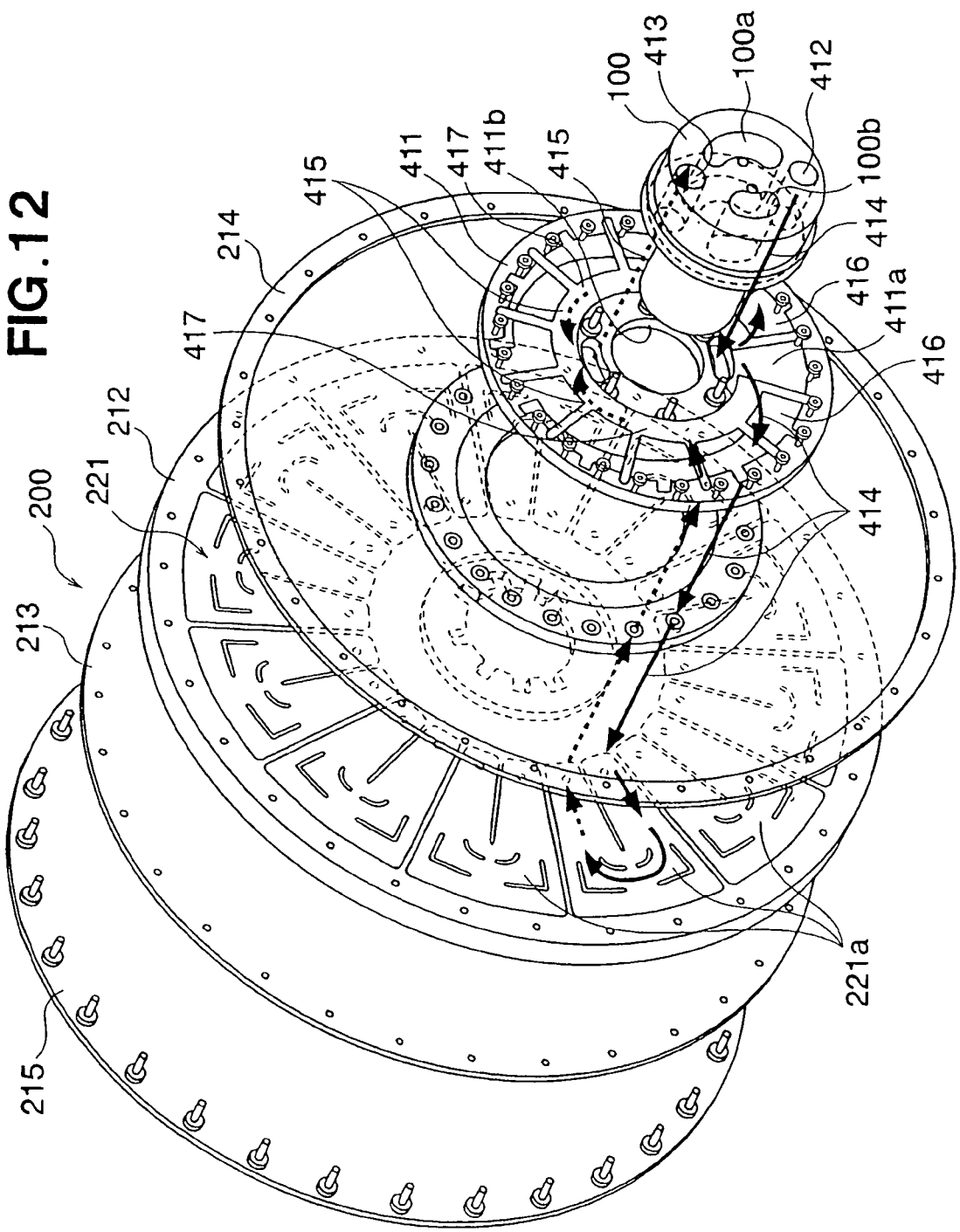
FIG. 12 is an exploded perspective view showing a coolant flow path for allowing circulation of a coolant through a cooling flow channel structure formed in a coil holder plate of the motor according to the present invention.
Figure 13:
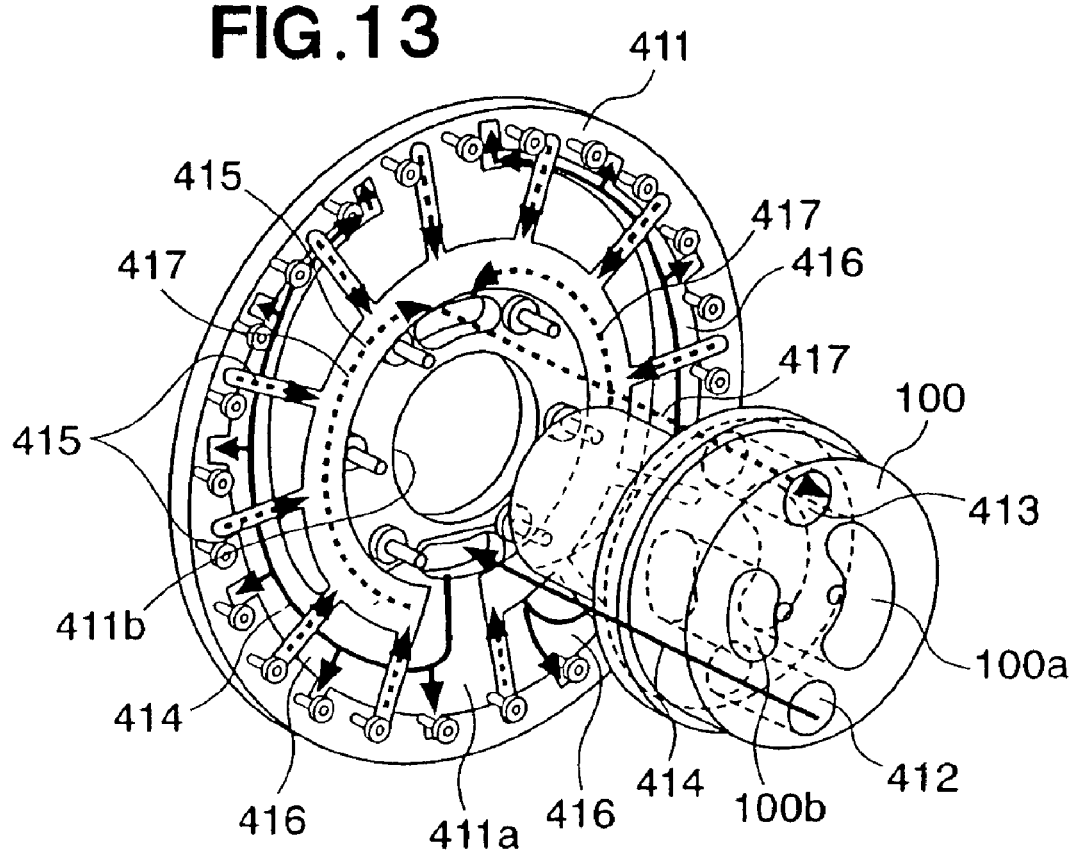
FIG. 13 is an enlarged view of a portion of FIG. 12, showing part of the coolant flow path formed in a coolant manifold.
Figure 14:
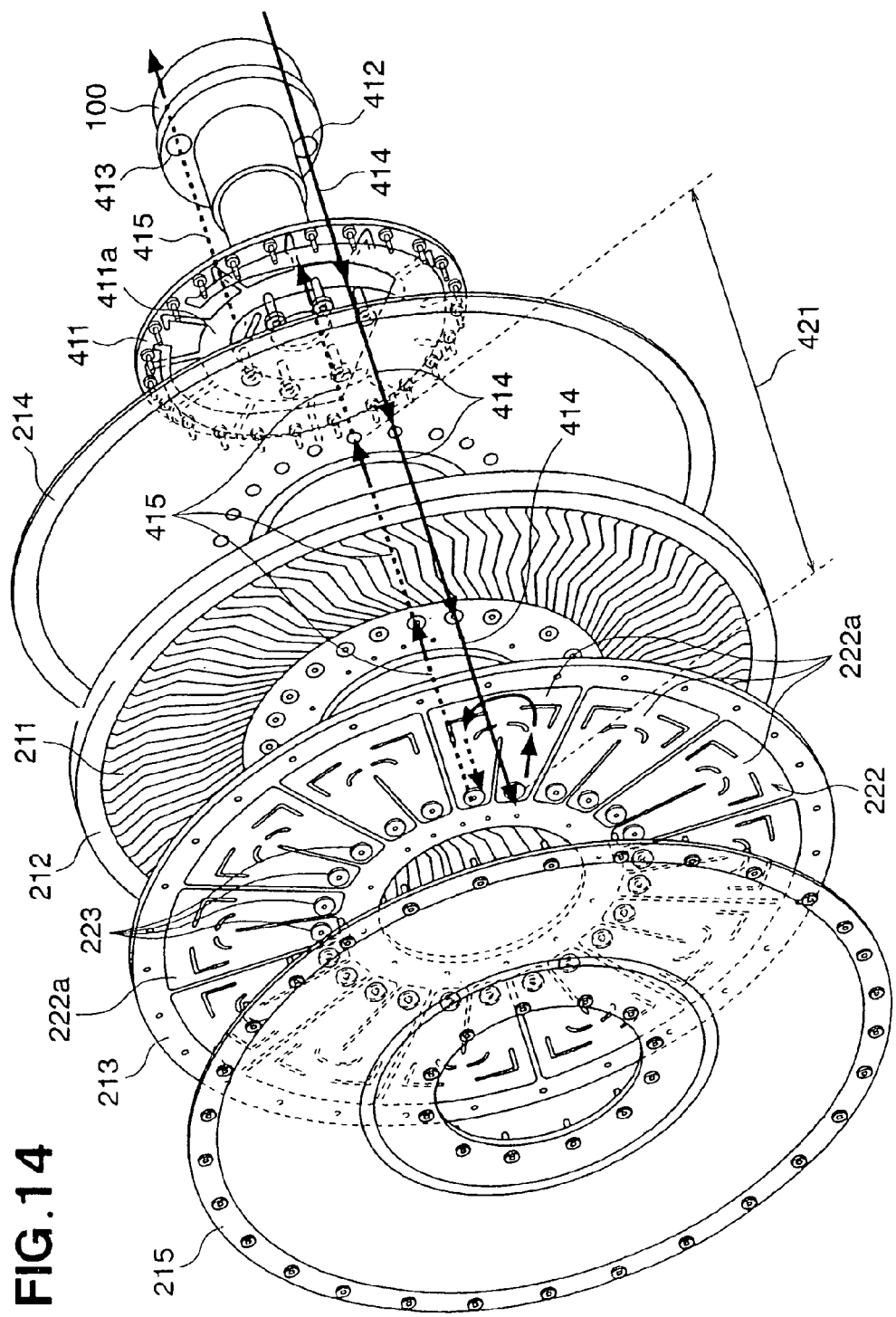
FIG. 14 is an exploded perspective view showing a coolant flow path for allowing circulation of the coolant through a cooling flow channel structure formed in a coil cover plate of the motor according to the present invention.
Figure 15:
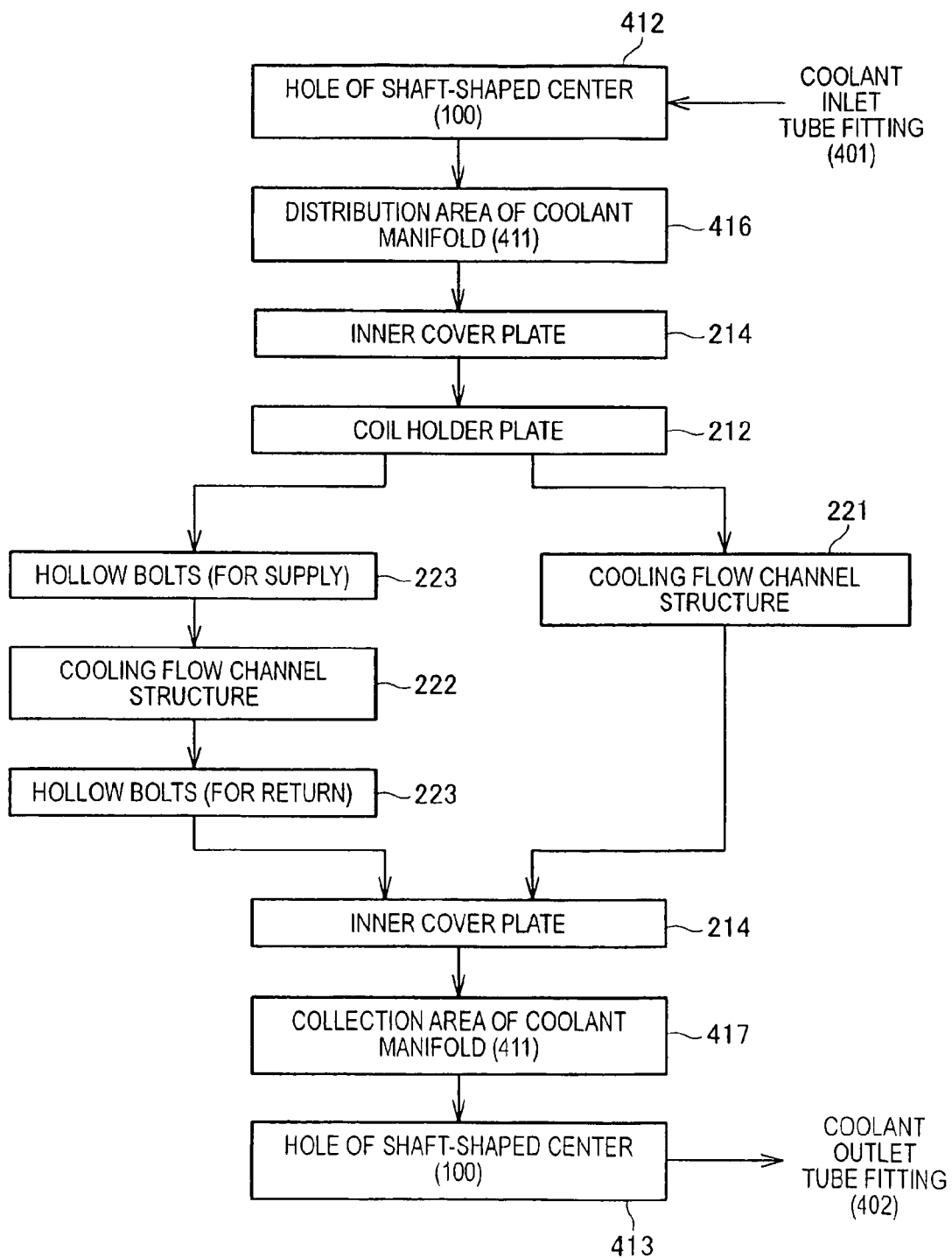
FIG. 15 is a block diagram showing the flow of coolant in a conceptual manner.

A description of the coolant flow path or channel (cooling line) of the cooling structure 400 is given next with reference to FIGS. 12 to 15. FIG. 12 is an exploded perspective view of the in-wheel motor 10 as viewed form the inner side, and shows a coolant flow path for allowing circulation of the coolant through the cooling flow channel structure 221 of the coil holder plate 212; FIG. 13 is an enlarged view of a portion of FIG. 12, showing part of the coolant flow path formed in the coolant manifold; FIG. 14 is an exploded perspective view of the in-wheel motor 10 as viewed from the outer side, and shows a coolant flow path for allowing circulation of the coolant through a cooling flow channel structure of the coil cover plate; and FIG. 15 is a block diagram showing the flow of coolant in a conceptual manner.

Described first with reference to FIGS. 12 and 13 is the configuration for allowing coolant to flow and circulate to the cooling flow channel structure 221 of the coil holder plate 212 of the stator 200. The cooling flow channel structure 221 is formed on the lateral portion of the inner side of the coil holder plate 212 of the stator 200, as shown in FIG. 12. The cooling flow channel structure 221 comprises 12 individual cooling flow channels 221a arranged in the circumferential direction at 30°-angle intervals. Each of the individual cooling flow channels 221a comprises a coolant inlet hole 221a-1 and a coolant outlet hole 221a-2.

In FIG. 12, reference numeral 213 denotes a coil cover plate, 214 denotes an inner cover plate, and 215 denotes an outer cover plate.

Furthermore, in FIG. 12, a coolant divider or manifold 411 is disposed on the inner side of the inner cover plate 214. The coolant manifold 411 comprises the stationary system together with the shaft-shaped central portion 100 and the stator 200. The coolant manifold 411 is a member having a function for allotting a supply path and a return path of the coolant to each of the individual cooling flow channels. FIGS. 12 and 13 are perspective views of the structure related to the coolant flow channels formed inside the coolant manifold 411. In the coolant manifold 411, a structure (the internal structure itself that forms the flow channel structure) 411a related to the coolant flow channels is formed in a hermetically sealed manner, as shown in FIG. 12. The coolant manifold 411 is formed by casting using a core mold. The overall structure of the coolant manifold 411 is a ring shape and has a central hole 411 into which the shaft-shaped central portion 100 is inserted.

The coolant inlet tube fitting 401 and the coolant outlet tube fitting 402 are disposed in the internal end face of the shaft-shaped central portion 100, as shown in FIGS. 1 and 2. In FIGS. 12 and 13, an axial hole 412 formed in the shaft-shaped central portion 100 is a coolant inlet port that leads at one end thereof to the coolant inlet tube fitting 401, and an axial hole 413 also formed in the shaft-shaped central portion 100 is a coolant outlet port that leads at one end thereof to the coolant outlet tube fitting 402.

As for the coolant flow path extending through the shaft-shaped central portion 100, the coolant manifold 411, and cooling flow channel structure 221 of the coil holder plate 212, a coolant supply path is indicated by the solid line arrows 414, and a coolant return path is indicated by the broken line arrows 415 as shown in FIGS. 12 and 13. It will be appreciated that the coolant supply path (indicated by the solid line arrows 414) and the coolant return path (indicated by the broken line arrows 415) are formed for each individual cooling flow channel 221a in the cooling flow channel structure 221 of the coil holder plate 212.

In the coolant manifold 411 described above, the coolant supply path and the coolant return path are allotted to each individual cooling flow channels 221a of the cooling flow channel structure 221 so that the coolant is distributed to and collected from the individual flow channels 221a by means of the coolant manifold 411. The coolant manifold 411 has a distribution area 416 in which the coolant supply path is formed, and a collection area 417 in which the coolant return path is formed. These areas 416 and 417 are formed as mutually different areas In the illustrated embodiment, the coolant manifold 411 is formed as a double layered structure in which, as shown in FIG. 13, a first layer defining the distribution area 416 is formed on a rear side of the drawing sheet including FIG. 13, and a second layer defining the collection area 417 is formed on a front side of the drawing sheet including FIG. 13. The distribution area 416 is provided to extend along an outer peripheral edge of the coolant manifold 411, and the collection area 417 is provided to extend along an inner peripheral edge of the coolant manifold 411. That is, the distribution area 416 is disposed outward of the collection area 417 in a radial direction of the coolant manifold 411. This arrangement is effective to suppress transfer of heat from the collection area 714 including the coolant return path to surrounding parts of the in-wheel motor 10.

FIG. 15 shows a block diagram illustrative of the manner in which the coolant is circulated through the cooling flow channel structure 221 of the coil holder plate 212.

The coolant introduced from the coolant inlet tube fitting 401 flows through the axial hole 412 formed in the shaft-shaped central portion 100, passes successively through the distribution area 416 of the coolant manifold 411, the inner cover plate 214 and the coil holder plate 212, and is supplied to the cooling flow channel structure 221. In a return path, the coolant left from the cooling flow channel structure 221 passes successively through the inner cover plate 214, the collection area 417 of the coolant manifold 411, and the coolant outlet port 413 of the in-wheel motor 10, and finally discharged from the coolant outlet tube fitting 402.

Described next with reference to FIG. 14 is an arrangement for allowing circulation of the coolant through the cooling flow channel structure 222 of the coil cover plate 213 of the stator 200. The cooling flow channel structure 222 is formed in the lateral portion of the outer side of the coil cover plate 213 of the stator 200, as shown in FIG. 14. The cooling flow channel structure 222 comprises 12 individual cooling flow channels 222a arranged in the circumferential direction at 30°-angle intervals. Each of the individual cooling flow channels 222a comprises a coolant inlet hole 222a-1 and a coolant outlet hole 222a-2.

In FIG. 14, reference numeral 211 is a coil plate, 212 is the coil holder plate, 214 is the inner cover plate, 215 is the outer cover plate, 411 is the coolant manifold, and 100 is the shaft-shaped central portion.

As shown in FIG. 14, the coolant manifold 411 disposed on the inner side of the inner cover plate 214 functions to allot the coolant supply path indicated by solid line arrows 414) and the coolant return path (indicated by broken line arrows 416) to each individual cooling flow channels 222a of the cooling flow channel structure 222 of the coil cover plate 213 so that the coolant is distributed to and collected from the individual flow channels 222a by means of the coolant manifold 411. In FIG. 14, the internal structure 411a defining part of the coolant supply path and the coolant return path of the coolant manifold 411 is shown in perspective. It will be appreciated that the coolant supply path (indicated by the solid line arrows 414) and the coolant return path (indicated by the broken line arrows 415) are formed for each individual cooling flow channel 222a in the cooling flow channel structure 222 of the coil cover plate 213.

In FIG. 14, an area 421 is a flow channel portion formed by the hollow bolts 223 described above. The hollow bolts 223 serves in double as a fastening means for connecting the coil holder plate 212 and coil cover plate 213 that accommodate the coil plates 211, and also as a channel forming means that defines flow channels extending between the coolant manifold 411 and the cooling flow channel structure 222 of the coil cover plate 213 with respect to each of the coolant supply path and the coolant return path. The hollow bolts 223 are provided in correspondence with the coolant inlet holes 222a-1 and coolant outlet holes 222a-2 of the individual cooling flow channels 222a of the coil cover plate 213. The coolant inlet holes 222a-1 and coolant outlet holes 222a-2 of the individual cooling flow channels 222a of the cooling flow channel structure 222 of the coil cover plate 213 correspond in position to the coolant inlet holes 221a-1 and coolant outlet holes 221a-2, respectively, of the individual cooling flow channels 221a of the cooling flow channel structure 221 in the coil holder plate 212. The hollow bolts 223 comprise a first group of hollow bolts for connecting the coolant inlet holes 221a-1 and coolant inlet holes 222a-1, and a second group of hollow bolts for connecting the coolant outlet holes 221a-2 and coolant outlet holes 222a-2.

In the coolant manifold 411, the coolant supply path indicated by the solid line arrows 414 is allotted by the distribution area 416 to not only each of the individual cooling flow channels 221a of the cooling flow channel structure 221 but also each of the individual cooling flow channels 222a of the cooling flow channel structure 222. Similarly, by the collection area 417 of the coolant manifold 411, the coolant return path indicated by the broken line arrows 415 is allotted not only to each of the individual cooling flow channels 221a but also to each of the individual cooling flow channels 222a. Thus, by virtue of the coolant manifold 411, the coolant is distributed to and collected from the individual cooling flow channels 221a, 222a of the cooling flow channel structures 221, 222.

FIG. 15 shows in block diagram a flow of the coolant circulating through the cooling flow channel structure 222 of the coil cover plate 213. The coolant introduced from the coolant inlet tube fitting 401 flows through the axial hole 412 formed in the shaft-shaped central portion 100, and passes successively through the distribution area 416 of the coolant manifold 411, the inner cover plate 214 and the coil holder plate 212. The flow is divided in two branches from the coil holder plate 212. One branch goes to the cooling flow channel structure 221 from the coil holder plate 212, and the other branch goes to the first group of hollow bolts (in the supply path) 223. Through the flow channels formed in the respective hollow bolts 223, the coolant is supplied to the cooling flow channel structure 222 of the coil cover plate 213. In the return path, the coolant left from the cooling flow channel structure 222 flows in the second group of hollow bolts (in the return path) 223, then passes successively through the inner cover plate 214, the collection area 417 of the coolant manifold 411, and the hole 413 of the shaft-shaped central portion 100, and is finally discharged from the coolant outlet tube fitting 402.

It is apparent from the above description of the cooling structure 400 that, in accordance with the in-wheel motor 10 of the present invention, the cooling piping and other components for creating a flow no longer need to be externally disposed or supported using a space within the housing, and the space can be reduced because the coolant flow channels are formed using the structural portion of a stationary system composed of the shaft-shaped central portion 100 and stator 200. A structurally very rigid design is made possible by integrally assembling the shaft-shaped central portion 100, stator 200, and rotor 300, yielding a highly reliable and more compact motor. The motor is particularly suitable for driving a vehicle. Furthermore, in the present invention, high output and internal sealing can both be achieved because of the structure in which the stator 200 is held between the inner rotor 301 and outer rotor 302. As a result, efficient internal cooling by way of the shaft-shaped central portion 100 is made possible. Also, since the structure cools the coil plates 211 from both sides, the cooling performance of the structure is high. The in-wheel motor according to the present invention, in which the cooling lines are brought together in the shaft-shaped central portion 100, has higher structural rigidity in comparison with cooling lines that are formed in an unorganized fashion by using a plurality of hoses and other components.

The power supply system 500 mounted in the in-wheel motor 10 is described next with reference to FIGS. 16 to 28.

Figure 16:
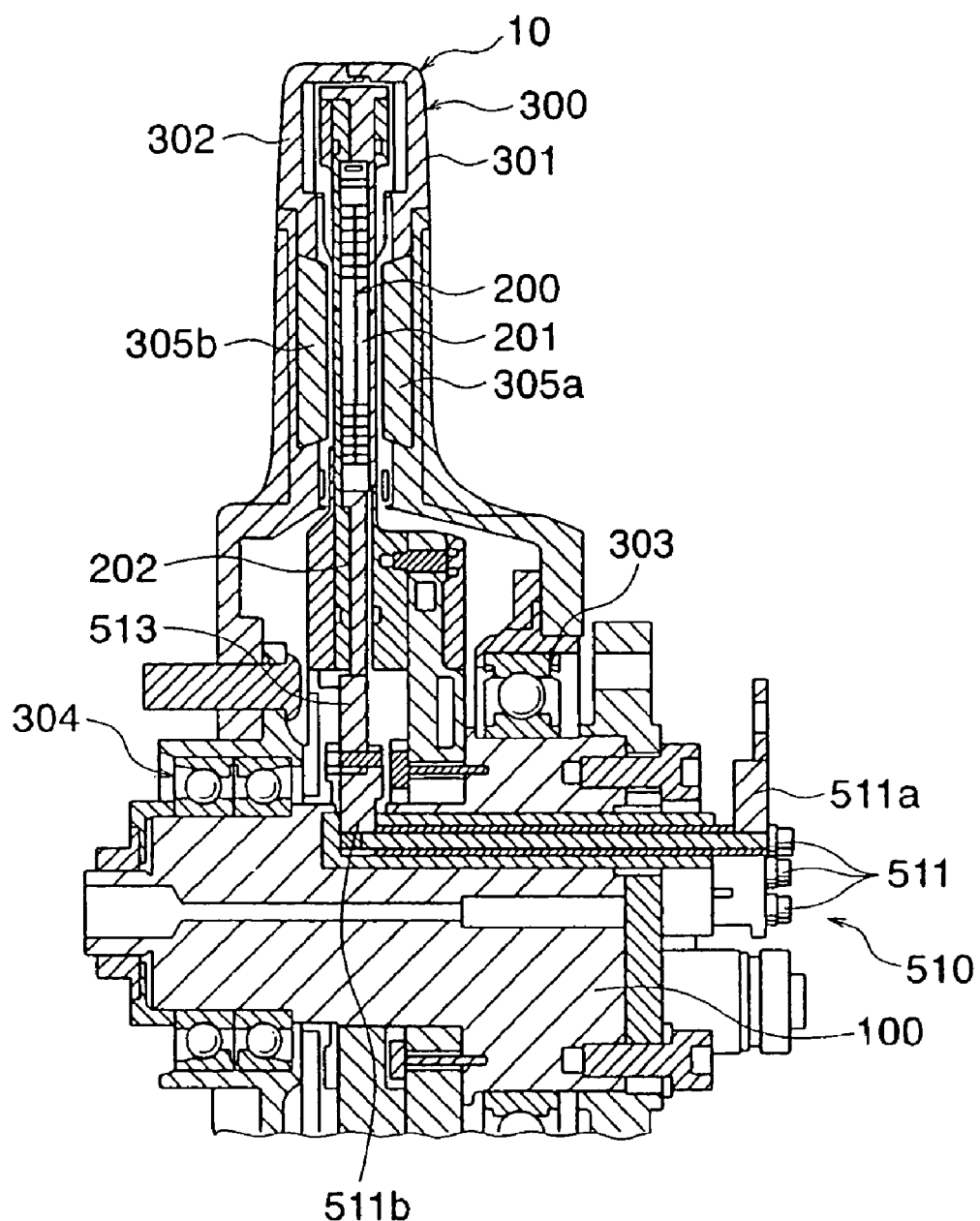
FIG. 16 is a longitudinal sectional view showing substantially an upper half of the motor that includes a shaft-shaped central portion of the present invention.

FIG. 16 is a longitudinal sectional view showing substantially the upper half that includes part of the shaft-shaped central portion 100 in the in-wheel motor 10. Particularly emphasized in FIG. 16 is the power supply system portion mounted on the shaft-shaped central portion 100 and stator 200. In FIG. 16, the same reference numerals are used for the same elements as the elements described above in FIG. 1 and other drawing figures, and a description of these elements is omitted.

Figure 25:
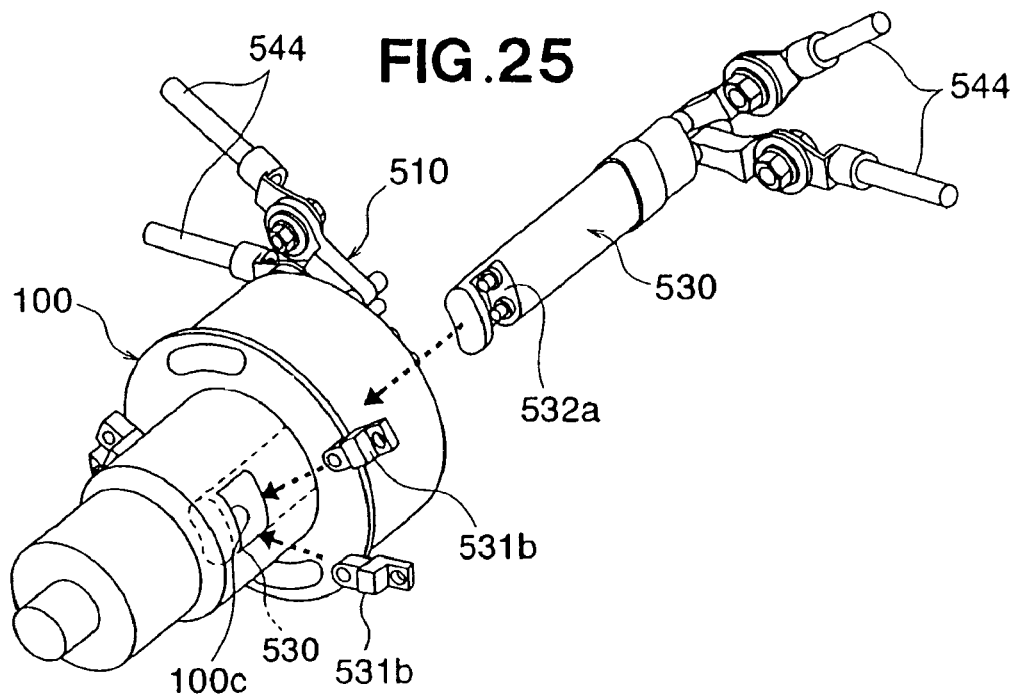
FIG. 25 is a perspective view that shows a second stage of assembly of the first and second current input bus bar modules of the shaft-shaped central portion.

Two holes 100a and 100b are formed for power supply wiring in the axial direction of the shaft-shaped central portion 100, as shown in FIG. 12, for example. A first current input bus bar module 510 is inserted into the hole 100a, as shown in FIG. 19, and a second current input bus bar module 530 is inserted into the hole 100b, as shown in FIG. 25.

Figure 18:
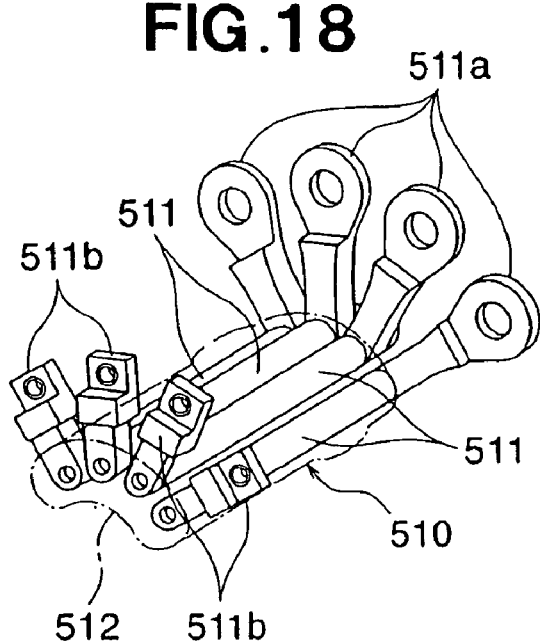
FIG. 18 is a perspective view showing the configuration of a first current input bus bar module according to the present invention with an insulated holder shown in phantom lines for clarity.
Figure 19:
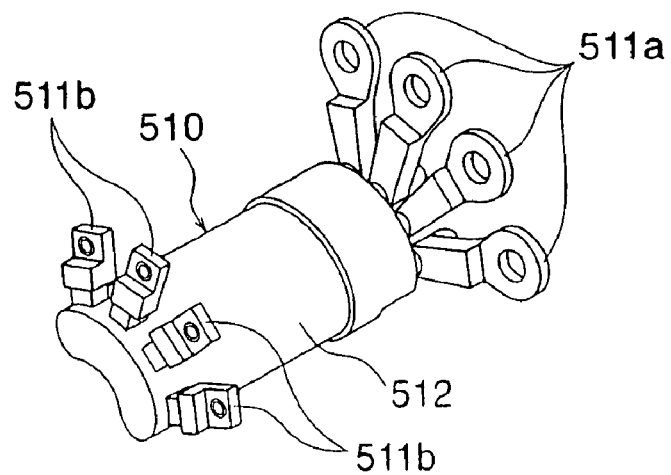
FIG. 19 is a perspective view showing the configuration of the first current input bus bar module with the insulated holder shown in solid lines.

In FIGS. 16, 18, and 19, only the first current input bus bar module 510 in particular is shown. FIGS. 18 and 19 show the first current input bus bar module 510 removed from the structure. The first current input bus bar module 510 is disposed parallel to four rod-shaped interface bus bars 511, as shown in FIG. 18. The four interface bus bars 511 are accommodated inside an insulated holder 512 of flattened tubular configuration. Terminal members 511a are disposed in the radial direction on the internal terminal of the interface bus bars 511. Joint bus bars 511b are connected to the external terminals of the interface bus bars 511, and the joint bus bars 51b are disposed so as to protrude laterally from the insulated holder 512

The terminal members 511a form one end of the interface bus bars 511, and the joint bus bars 511b are members that are separate from the interface bus bars 511, as described below.

In the first current input bus bar module 510, four interface bus bars 511 are accommodated in the insulated holder 512 so as to form a single module of integrated structure. In FIG. 18, the insulated holder 512 is shown using phantom lines so that the internal interface bus bars 511 can be viewed.

Figure 17:
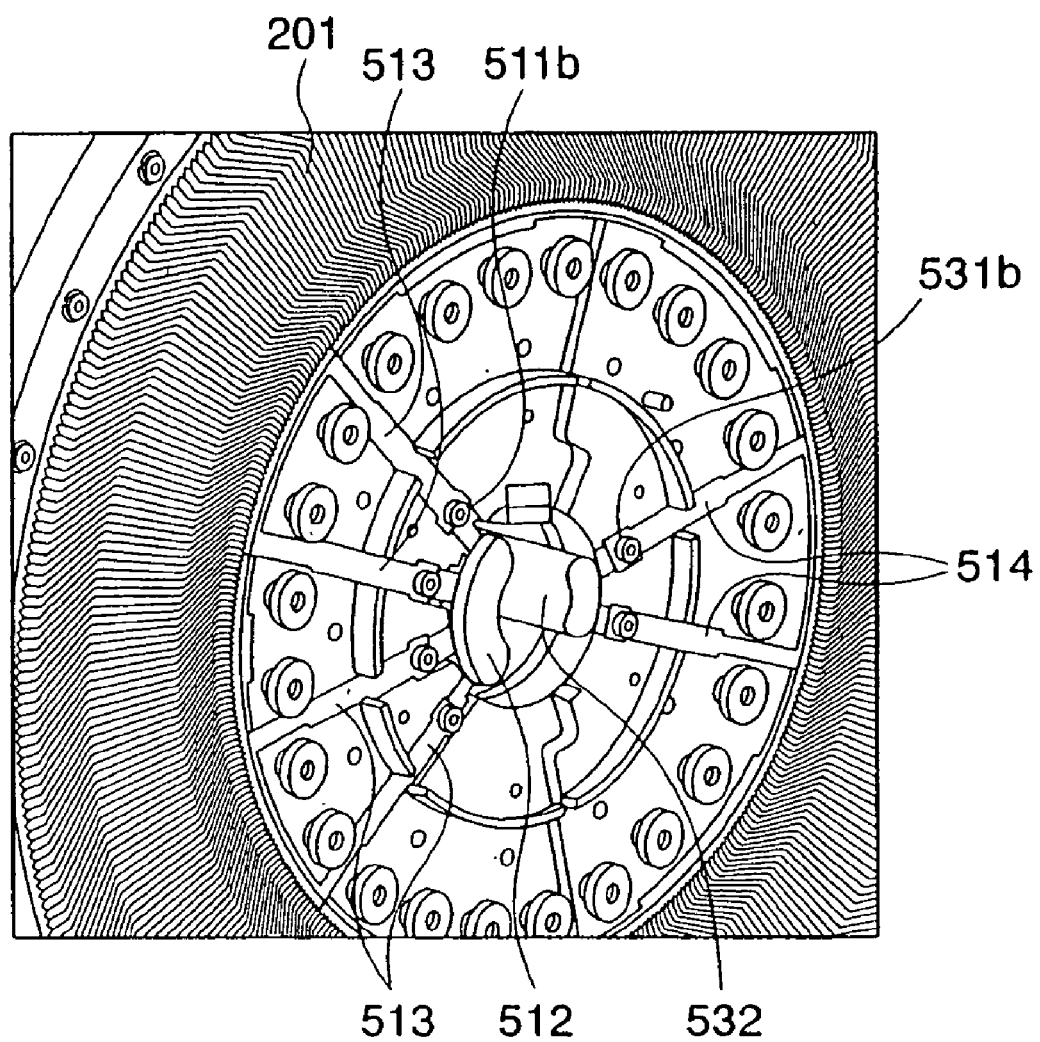
FIG. 17 is a partial perspective view showing a joint bus bar and a coil bus bar in the stator coil as they are joined together according to the present invention.

With the first current input bus bar module 510 incorporated into the shaft-shaped central portion 100 in the in-wheel motor 10, as shown in FIG. 16, the four terminal members 511a protrude from the internal end face of the shaft-shaped central portion 100, and four terminal members 511a are disposed in a radial pattern in the radial direction. The four joint bus bars 511b are disposed so as to be aligned with the arrayed positions of the wiring connections of the coil plates 211 disposed within the stator 200. In the coil plates 211, a set of two coil bus bars 514 and a set of four coil bus bars 513, which are part of a plurality of coil terminals of the internal peripheral edge of the stator coil 201, are mounted and laid out by soldering, as shown in FIG. 17. The four joint bus bars 511b that protrude from the first current input bus bar module 510 described above are connected to the four coil bus bars in a corresponding manner.

The second current input bus bar module 530 described above is disposed in parallel to two interface bus bars (531, shown in FIG. 24, for example), and the two interface bus bars 531 are accommodated inside the insulated holder 532. The terminal members 531a are disposed on the internal terminals of the interface bus bars 531 so as to extend in the radial outward direction. The joint bus bars 531b are disposed on the external terminals of the interface bus bars 531 so as to protrude from the insulated holder 532 in a radial outward direction.

The second current input bus bar module 530 is also disposed in the shaft-shaped central portion 100 in essentially the same manner as the first current input bus bar module 510 described above. Two terminal members 531a protrude from the end face of the inner side of the shaft-shaped central portion 100 when mounted in the shaft-shaped central portion 100, and the two terminal members 531a extend in a radial pattern in the radial direction. The two joint bus bars 531b are connected to the two coil bus bars 514 in a corresponding manner.

Figure 20:
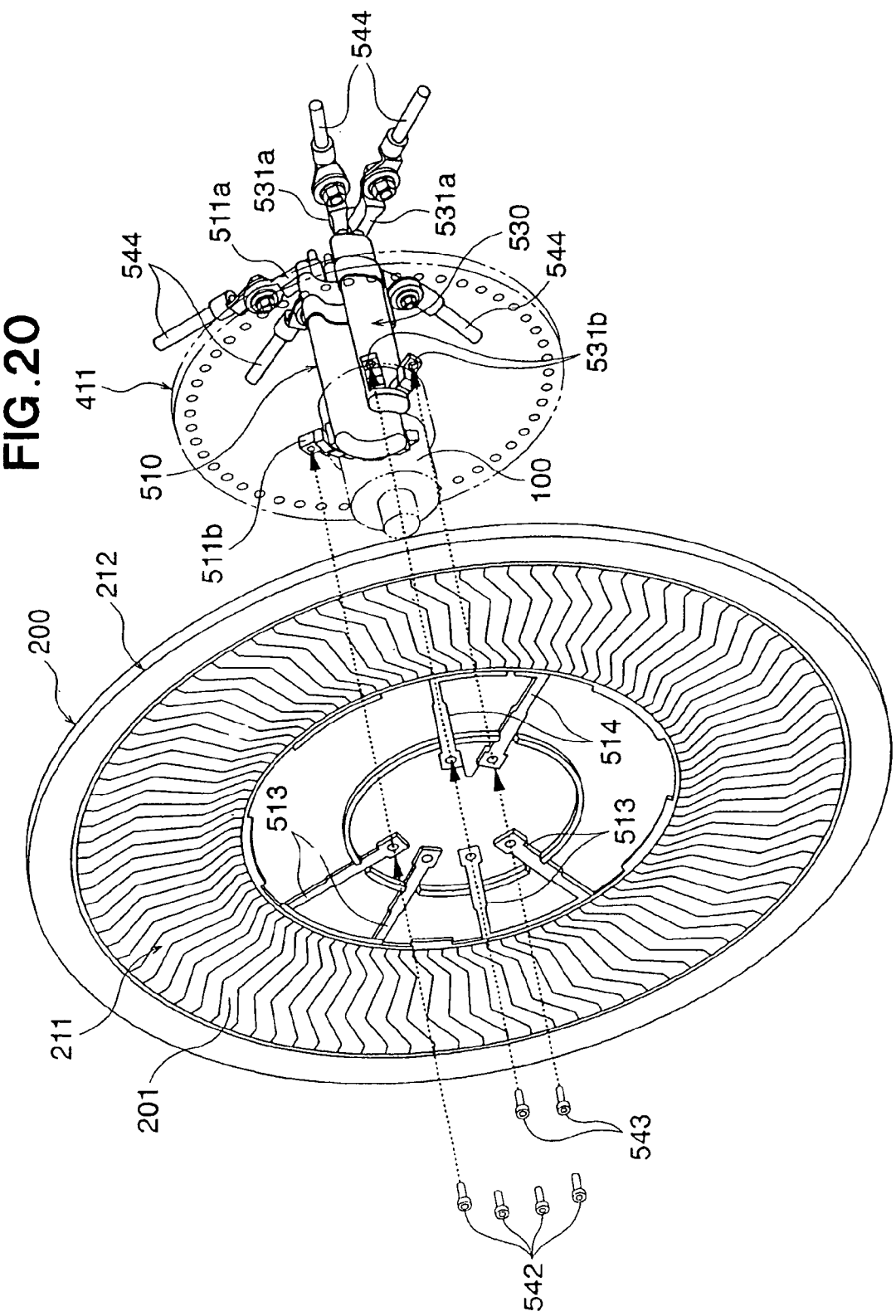
FIG. 20 is a perspective view showing the connection relationship between the first and second current input bus bar modules and the coil bus bar from the stator coil of the motor.

FIG. 20 is a perspective view showing the connection relationship between the first and second current input bus bar modules 510 and 530, and the stator coil 201 that comprises the coil plates 211 in the stator 200 held against the coil holder plate 212, as viewed from the outer side. In FIG. 20, the same reference numerals are used for the same elements as those described earlier. The joint bus bars 511b of the four interface bus bars 511 of the first current input bus bar module 510 are connected in a corresponding manner to the four coil bus bars 513 by means of bolts 542. The joint bus bars 531b of the two interface bus bars 531 of the second current input bus bar module 530 are connected in a corresponding manner to the two coil bus bars 514 by means of bolts 543. A total of six interface bus bars 511 and 531 are disposed in correspondence with the coil bus bars 513 and 514, respectively for operation with three-phase alternating current (having an U-phase, a V-phase, and a W-phase for cooperation with the N-poles and S-poles of the magnets 305a and 305b).

FIG. 20, in which 411 is the coolant manifold described above, shows the positional relationship between the shaft-shaped central portion 100, first current input bus bar module 510, and second current input bus bar module 530. The plurality of members 544 indicate the power feed harness for connecting to a power supply.

Figure 21:
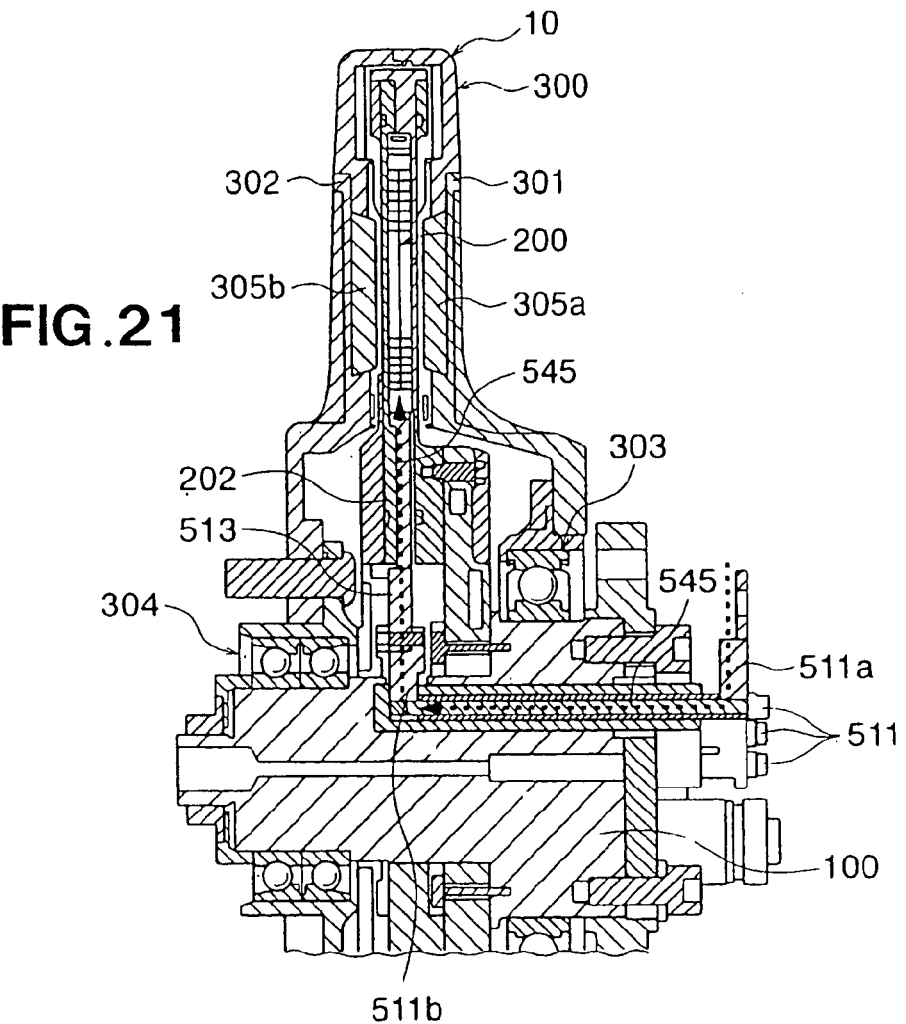
FIG. 21 is a longitudinal sectional view showing substantially the upper half of the motor including the shaft-shaped central portion, the view showing the flow of coil exciting electric current.
Figure 22:
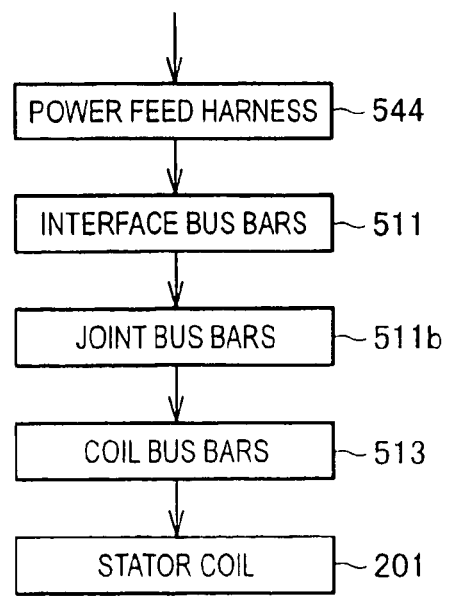
FIG. 22 is a block diagram showing a sequence of flow of the driving electric current supplied to the stator coil.

FIG. 21 is a longitudinal sectional view similar as FIG. 16. In this Figure, the flow of electric power (electric current) is indicated by the broken line 545. The alternating electric current of one phase of the three-phase alternating electric current fed from an external three-phase alternating power supply is supplied to the coil portion of the corresponding stator coil 201 through a single interface bus bar 511 of the first current input bus bar module 510. The alternating electric current 545 is fed to the stator coil 201 through the power feed harness 544, power feed terminal member 511a, interface bus bars 511, joint bus bars 511b, and coil bus bar 513. FIG. 22 shows in block diagram the flow of electric current supplied to the stator coil 201 as described above.

The method of assembling the power supply system 500 is described next with reference to FIGS. 23 to 28.

Figure 23:
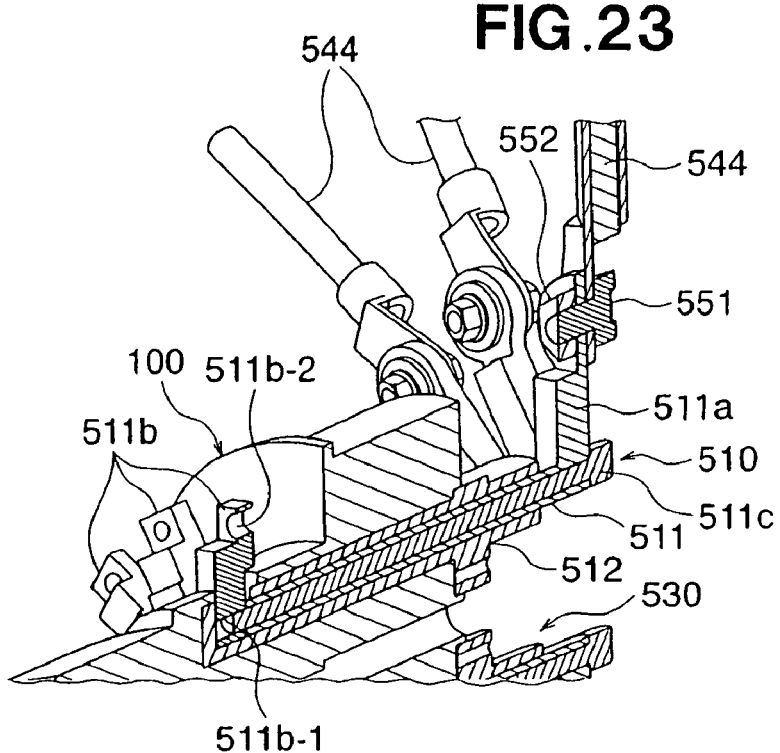
FIG. 23 is a partial cross-sectional view illustrative of the manner in which the first and second current input bus bar modules of the shaft-shaped central portion are assembled.

The first current input bus bar module 510 is inserted into a hole 100a formed in the shaft-shaped central portion 100, as shown in FIG. 23. The second current input bus bar module 530 is similarly inserted into a hole 100b formed in the shaft-shaped central portion 100. The structure and method of assembly of the first current input bus bar module 510 and second current input bus bar module 530 are substantially the same.

In FIG. 23, the first current input bus bar module 510 disposed in the shaft-shaped central portion 100 is provided with a rod-shaped rectilinear portion of the interface bus bar 511 shaped as a hollow bus bar. A bus bar bolt 511c is inserted into the hollow portion within the interface bus bar 511. The above-described terminal member 511a is formed on the right-end portion of the interface bus bar 511. The power feed harness 544 is connected to the terminal member 511a by means of a bolt 511 and nut 552. The bus bar bolt 511c protrudes from an end portion (right-end portion in FIG. 23) of the interface bus bar 511, and the distal end of the bus bar bolt 511c is connected to the internal fastener 511b-1 of the joint bus bars 511b. External fasteners 511b-2 for connection with the coil bus bar 513 are formed on the external end portion of the joint bus bars 511b.

The same structure as the one described above is adopted for the other three interface bus bars 511 in the first current input bus bar module 510, and for the two interface bus bars 531 in the second current input bus bar module 530.

The method of mounting the interface bus bars in the shaft-shaped central portion 100 is described next with reference to FIGS. 24 to 26, using the example of the second current input bus bar module 530.

Figure 24:
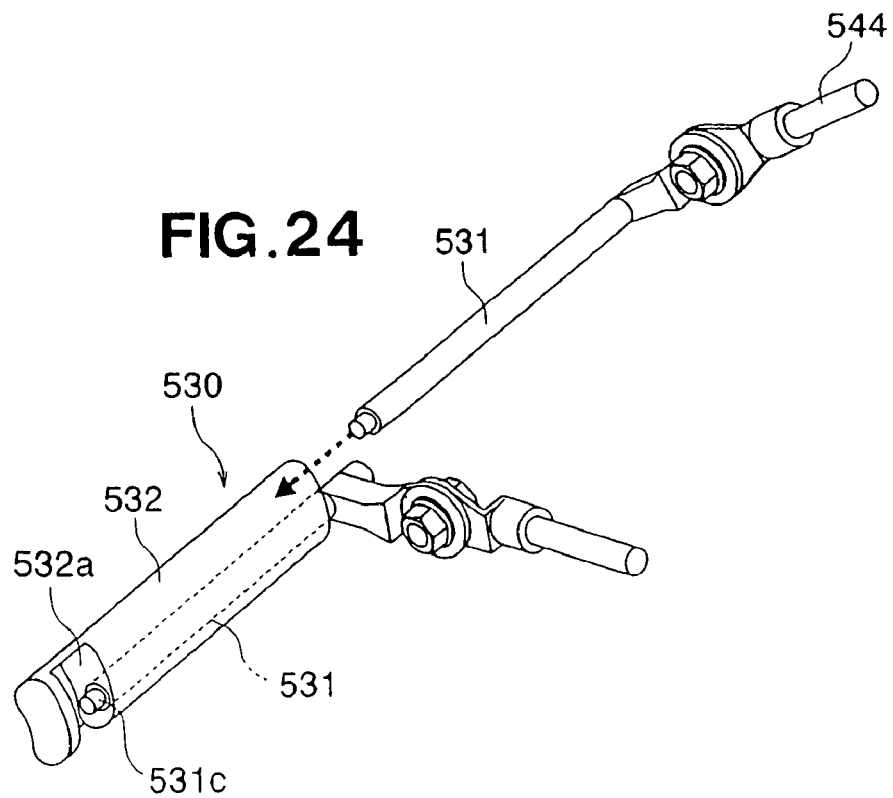
FIG. 24 is a perspective view showing a first stage of assembly of the first and second current input bus bar modules of the shaft-shaped central portion.

First, two interface bus bars 531 are inserted and set in the insulated holder 532, as shown in FIG. 24. In FIG. 24, a single interface bus bar 531 is accommodated in the insulated holder 532, and the remaining interface bus bar 531 is about to be inserted in the insulated holder 532. A cutout recess or aperture 532a is formed in the external end portion of the insulated holder 532. The distal end of the bus bar bolt 531c of the interface bus bar 531 is exposed inside the aperture 532a. The second current input bus bar module 530 shown in FIG. 25 is formed by assembling the components as shown in FIG. 24.

Next, the second current input bus bar module 530 is inserted into the hole 100b formed in the shaft-shaped central portion 100, as shown in FIG. 25. In FIG. 25, the first current input bus bar module 510 has already been inserted into the hole 100a in the shaft-shaped central portion 100. The second current input bus bar module 530, which has been assembled as a module, is furthermore about to be inserted into the hole 100b in the shaft-shaped central portion 100. Also, the second current input bus bar module 530 inserted into the shaft-shaped central portion 100 is indicated by broken lines, and the joint bus bars 531b are mounted from the exterior on the second current input bus bar module 530. A hole 100c is also formed in the shaft-shaped central portion 100 in correspondence with the aperture 532a of the insulated holder 532 of the second current input bus bar module 530. The joint bus bars 531b are inserted through the hole 100c and the aperture 532a, and are connected to the distal end of the interface bus bars 531.

Figure 26:
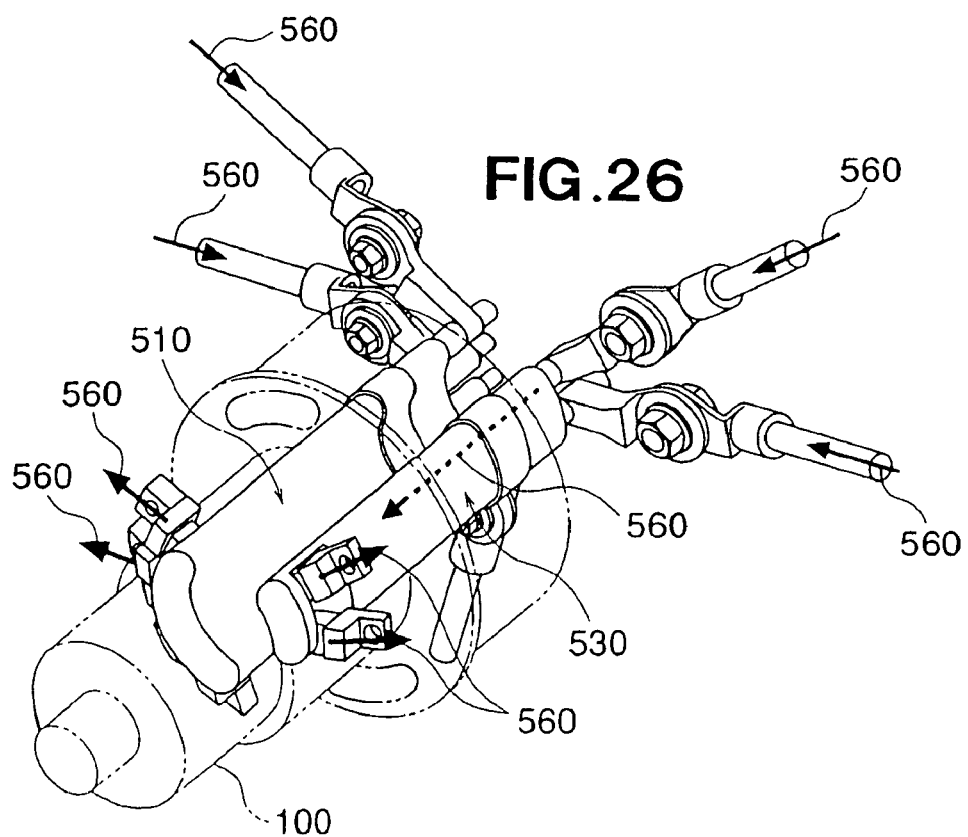
FIG. 26 is a perspective view showing a final stage of assembly of the first and second current input bus bar modules of the shaft-shaped central portion.

A modular structure such as the one shown in FIG. 26 is formed as a structure related to the shaft-shaped central portion 100 by mounting the first current input bus bar module 510 and the second current input bus bar module 530 in the shaft-shaped central portion 100. In this figure, the shaft-shaped central portion 100 is indicated by phantom lines for clarity. In FIG. 26, an arrow 560 indicates the flow of electric current, The electric current flows from the power supply to the stator coil.

Figure 27:
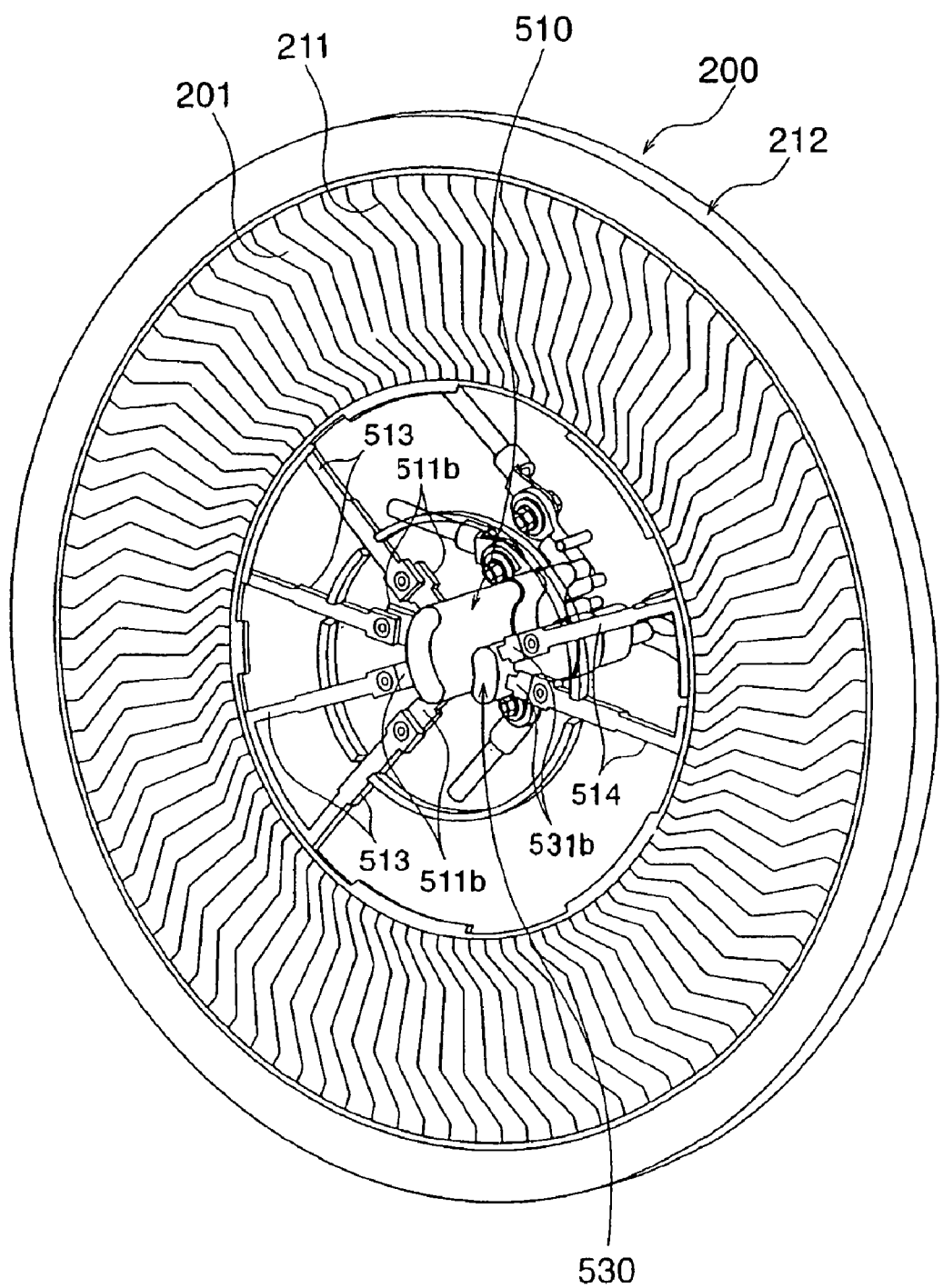
FIG. 27 is a perspective view showing the wire connection of the joint bus bar and the coil bus bar, as viewed from the outer side of the motor.

FIG. 27 shows the connection relationship between the coil bus bars 513 and 514 brought out from the stator coil 201 in the stator 200, and the joint bus bars 511b and 531b of the first current input bus bar module 510 and second current input bus bar module 530 disposed in the shaft-shaped central portion 100, as viewed from the outer side.

Figure 28:
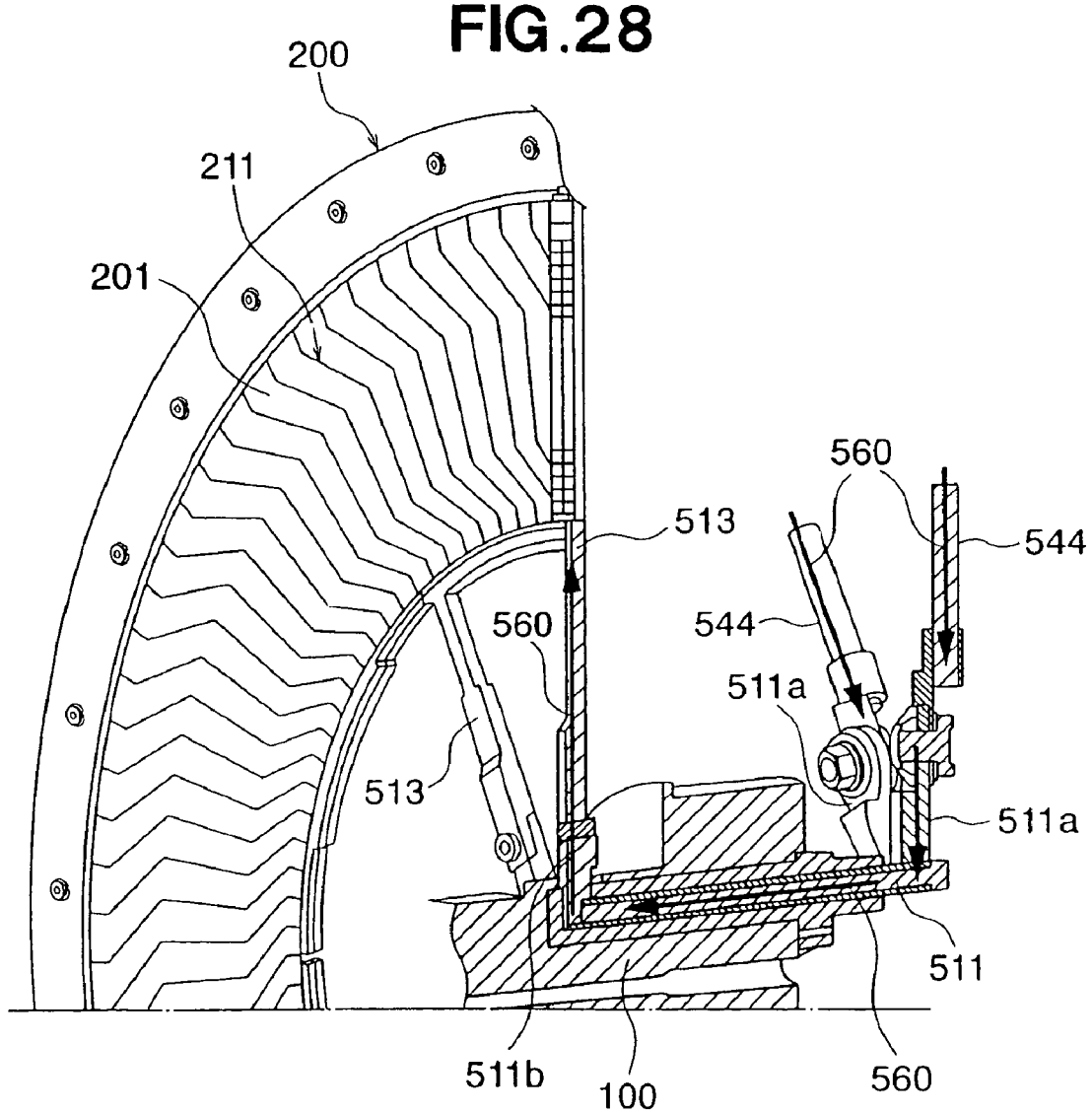
FIG. 28 is a partial cross-sectional perspective view of the stator and the shaft-shaped central portion showing a power feed path according to the present invention.

FIG. 28 is a partial enlarged cross-sectional view of the connection structure shown in FIG. 27. In FIG. 28, the same reference numerals are used for the same elements as the elements described earlier. Electric current 560 is fed to the stator coil 201 successively through the power feed harness 544, terminal members 511a, interface bus bar 511, joint bus bar 511b, and coil bus bar 513.

It is apparent from the above description of the power supply system 500 that, in accordance with the in-wheel motor 10 of the present invention, the power feed harness and other components no longer need to be externally exposed in the periphery of the motor or supported using a space within the housing, and the space can be reduced because the power feed pathway is formed using the structural portion of the stationary system comprising the shaft-shaped central portion 100 and stator 200. A structurally very rigid design is made possible by configuring the power supply system in the manner described above, yielding a highly reliable and more compact motor. The motor is particularly suitable for driving a vehicle. As shown in FIGS. 25 and 26, the work of assembling the components on the in-wheel motor 10 can be made very simple by preparing the power feed harness module in advance. In this case, since the direction of the motor 10 changes in accordance with the movement of the wheels in association with steering operations, a certain amount of leeway must be provided to anticipate the movement of the motor 10 in the case that the hoses and other components of the cooling structure and power supply system are externally mounted. However, in the present invention, since the cooling structure and power supply system comprise a linear pathway consolidated in the shaft-shaped central portion 100, the pathway is made as short as possible, thus contributing to a smaller, more lightweight, and more rigid motor 10.

The configuration, shape, size, and arrangement described in the illustrated embodiment provides an outline that allows the present invention to be understood and implemented, and numbers and compositions (materials) of configurations are merely examples. Therefore, the present invention is not limited to the embodiment described above, and various modifications can be implemented within a scope that does not depart from the spirit of the claims.

INDUSTRIAL APPLICABILITY

As described above, the present invention is typically useful when embodied as a drive motor for an electric automobile.

The invention claimed is:
1. An axial disk electric motor for rotatably driving a connected load, comprising:
 a stator comprising a coil holder for holding a stator coil and a coil cover covering the stator coil;
 a rotor provided with magnets and provided so as to cover the stator from both sides;
 a stationary shaft-shaped central portion disposed so as to extend through respective central portions of the rotor, and the stator, the shaft-shaped central portion being fixed to the stator; and
 a cooling structure provided inside of the stator and the shaft-shaped central portion,
 wherein the cooling structure comprises:
  a coolant inlet tube fitting disposed in an end face of the shaft-shaped central portion for introducing a coolant into a coolant inlet port formed in the shaft-shaped central portion;
  a coolant outlet tube fitting disposed in the end face of the shaft-shaped central portion for discharging the coolant therefrom via a coolant outlet port formed in the shaft-shaped central portion; and
  a coolant manifold disposed between the coolant inlet and outlet ports formed in the shaft-shaped central portion and flow channels formed in at least one of the coil holder and the coil cover for allotting a supply path and a return path of the coolant to each individual cooling flow channel of the flow channels,
 wherein the coolant manifold has a distribution area in which the coolant supply path is formed, and a collection area in which the coolant return path is formed,
 wherein the distribution area and the collection area are formed as mutually different areas and the coolant manifold has a double layered structure in which the distribution area forms one layer and the collection area forms another layer,
 wherein the coil holder and the coil cover both have a planar disk shape, and each of the flow channels for cooling the stator coil is disposed on one side of the coil holder and on one side of the coil cover,
 wherein the flow channels for cooling the stator coil comprise a plurality of individual cooling flow channels divided in a circumferential direction of the coil holder and the coil cover, and each of the individual cooling flow channels comprises an outgoing path extending in a radial outward direction between center portions and outer peripheral portions of the coil holder and the coil cover, and a return path that extends in a radial inward direction between the central portions and the outer peripheral portions of the coil holder and the coil cover, and
 wherein the coil holder and the coil cover are connected together by a plurality of hollow bolts, and each of the individual cooling flow channels of the coil holder and a corresponding one of the individual cooling flow channels of the coil cover are connected together by a flow channel formed in each of the hollow bolts.

2. The electric motor of claim 1, wherein the stator coil is a thin coil plate of circular disk-like configuration.

3. The electric motor of claim 1, the motor comprises a first rotor provided with one of the magnets and disposed inside the motor in a position close to the load, and a second rotor provided with another magnet and disposed inside the motor in a position away from the load and wherein the stator is disposed between the first rotor and the second rotor.

4. The electric motor of claim 3, in combination with a vehicle wheel, wherein the motor is provided inside the wheel of a vehicle for directly driving the wheel in a rotatable manner, the first rotor is disposed on a wheel side of the vehicle, and the second rotor is disposed on a vehicle body side of the vehicle.

5. The electric motor of claim 4, wherein each of the magnets of the first rotor and the second rotor is a planar disk magnet of annular configuration and comprises a plurality of magnet pieces arranged in a Halbach array configuration.

6. The electric motor of claim 3, wherein the first rotor and the second rotor are connected together at the peripheral portion of external peripheral edges thereof.

7. An electric motor for rotatably driving a connected load, comprising:
- an outer rotor provided with a magnet and disposed inside the motor in a position close to the load;
- an inner rotor provided with a magnet and disposed inside the motor in a position away from the load:
- a stator disposed between the outer rotor and the inner rotor, and provided with a stator coil:
- a stationary shaft-shaped central portion disposed so as to extend completely through respective central portions of the outer rotor, the inner rotor, and the stator; and
- a cooling structure provided using the interiors of the stator and the shaft-shaped central portion,
- wherein the stator comprises a coil holder for holding the stator coil, and a coil cover for covering the stator coil, and wherein the cooling structure comprises flow channels formed in a least one of the coil holder and the coil cover for circulation of a coolant to cool the stator coil,
- wherein the coil holder and the coil cover both have a planar disk shape, and each of the flow channels for cooling the stator coil is disposed on one side of the coil holder and on one side off the coil cover,
- wherein the flow channels for cooling the stator coil comprises a plurality of individual cooling flow channels divided in a circumferential direction of the coil holder and the coil cover, and each of the individual cooling flow channels comprises an outgoing path extending in a radial outward direction between center portions and outer peripheral portions of the coil holder and the coil cover, and a return path that extends in a radial inward direction between the central portions and the outer peripheral portions of the coil holder and the coil cover, and
- wherein the coil holder and the coil cover are connected together by a plurality of hollow bolts, and each of the individual cooling flow channels of the coil holder and a corresponding one of the individual cooling flow channels of the coil cover are connected together by a flow channel formed in each of the hollow bolts.

* * * * *